(12) United States Patent
Jeong et al.

(10) Patent No.: US 9,949,190 B2
(45) Date of Patent: Apr. 17, 2018

(54) METHOD AND APPARATUS FOR CONTROLLING WLAN

(71) Applicant: Samsung Electronics Co., Ltd., Gyeonggi-do (KR)

(72) Inventors: Sangsoo Jeong, Gyeonggi-do (KR); Songyean Cho, Seoul (KR); Erik Guttman, Waibstadt (DE)

(73) Assignee: Samsung Electronics Co., Ltd., Suwon-si (KR)

( * ) Notice: Subject to any disclaimer, the term of this patent is extended or adjusted under 35 U.S.C. 154(b) by 115 days.

(21) Appl. No.: 14/530,567

(22) Filed: Oct. 31, 2014

(65) Prior Publication Data

US 2015/0117411 A1 Apr. 30, 2015

(30) Foreign Application Priority Data

Oct. 31, 2013 (KR) .................. 10-2013-0131566
Apr. 29, 2014 (KR) .................. 10-2014-0051932
May 12, 2014 (KR) .................. 10-2014-0056738

(51) Int. Cl.
*H04W 36/14* (2009.01)
*H04W 36/00* (2009.01)
(Continued)

(52) U.S. Cl.
CPC ....... *H04W 36/14* (2013.01); *H04W 36/0061* (2013.01); *H04W 64/00* (2013.01); *H04W 4/22* (2013.01); *Y02B 60/50* (2013.01)

(58) Field of Classification Search
CPC . H04W 36/14; H04W 36/0061; H04W 64/00; H04W 4/22; H04W 4/02;
(Continued)

(56) References Cited

U.S. PATENT DOCUMENTS 8,340,626 B2* 12/2012 Edge .................. H04M 7/0078
455/404.1
8,942,660 B2* 1/2015 Edge ................ H04W 36/0022
455/404.1
(Continued)

FOREIGN PATENT DOCUMENTS

CN 101594606 A 12/2009
CN 102804852 A 11/2012
KR 20100113406 A 10/2010

OTHER PUBLICATIONS

International Search Report dated Feb. 2, 2015 in connection with International Application No. PCT/KR2014/010384; 3 pages.
(Continued)

*Primary Examiner* — Brian O'Connor

(57) ABSTRACT

A method of supporting handover of a terminal by a mobility management entity (MME) of a mobile communication system is provided. The method includes receiving, from a base station, a first message for handover to another network. The first message includes information on a cell to which the terminal is handed over. The method also includes transmitting, to a server, a second message for reporting information related to a location of the terminal and for providing a location continuity based on the first message. A terminal having both a 3GPP communication function and a WiFi function automatically switches on and off a WLAN according to a location, setting, or a pattern of a user, thereby preventing unnecessary battery consumption or performance deterioration and searching for an available WLAN in advance to access the WLAN.

12 Claims, 14 Drawing Sheets

(51) Int. Cl.
*H04W 64/00* (2009.01)
*H04W 4/22* (2009.01)

(58) Field of Classification Search
CPC ............... H04W 8/02; H04W 36/0033; H04W 36/0011; H04W 36/385
See application file for complete search history.

(56) References Cited

U.S. PATENT DOCUMENTS

| | | | |
|---|---|---|---|
| 8,942,665 B2 * | 1/2015 | Patel | H04W 4/22 455/404.1 |
| 8,964,695 B2 | 2/2015 | Bachmann et al. | |
| 8,965,377 B2 | 2/2015 | Zhang et al. | |
| 9,307,454 B2 * | 4/2016 | Edge | H04W 36/385 |
| 2004/0224691 A1 | 11/2004 | Hadad | |
| 2010/0202407 A1 | 8/2010 | Edge | |
| 2010/0311386 A1 * | 12/2010 | Edge | H04W 36/0022 455/404.1 |
| 2011/0098048 A1 | 4/2011 | Zhang et al. | |
| 2011/0216743 A1 | 9/2011 | Bachmann et al. | |
| 2013/0279475 A1 | 10/2013 | Nishida | |

OTHER PUBLICATIONS

Extended European Search Report issed for EP 14859182.9 dated Jan. 28, 2016, 13 pgs.
Lte Advanced, "3rd Generation Partnership Project; Technical Specification Group Services and System Aspects; Single Radio Voice Call Continuity (SRVCC; Stage 2 (Release 11)", 3GPP TS 23.216 V11.9.0 (Jun. 2013), Jun. 24, 2013, 68 pgs.
Lte Advanced, 3rd Generation Partnership Project; Technical Specification Group Services and System Aspects; Evaluation of LCS Control Plane Solutioss for EPS (Release 9), 3Gpp TR 23.891 V.9.0.0 (Mar. 2009), Mar. 13, 2009, 64 pgs.
Office Action dated Jul. 15, 2016 in connection with Japanese Patent Application No. 2015-555950, 4 pages.
3rd Generation Partnership Project; Technical Specification Group Services and System Aspects; Functional Stage 2 Description of Location Services (LCS) (Release 11); 3GPP TS 23.271 V11.2.0; Mar. 2013; 116 pages.
Foreign Communication from Related Counterpart Application; European Patent Application No. 14859182.9; Summons to Attend Oral Proceedings Pursuant to Rule 115(1) EPC dated Jun. 28, 2017; 6 pages.
Office Action dated Jan. 10, 2018 in connection with Chinese Patent Application 201480008048.5.

* cited by examiner

METHOD AND APPARATUS FOR CONTROLLING WLAN

CROSS-REFERENCE TO RELATED APPLICATION(S) AND CLAIM OF PRIORITY

The present application is related to and claims priority under 35 U.S.C. § 119(a) to Korean Application Serial Nos. 10-2013-0131566, 10-2014-0051932 & 10-2014-0056738, which were filed in the Korean Intellectual Property Office on Oct. 31, 2013, Apr. 29, 2014 and May 12, 2014 the entire content of which is hereby incorporated by reference.

TECHNICAL FIELD

The present invention relates to a technology of automatically switching on/off a Wireless Local Area Network (WLAN) according to a use location or a use pattern of a user, in a terminal which can use the WLAN, thereby improving an experience which a user feels.

BACKGROUND

In general, a mobile communication system was developed to provide voice services while guaranteeing activity of users. However, the mobile communication systems have extended their fields to the data providing services beyond the voice communication providing service and have now developed to such a level at which they can provide high speed data service. However, since resources are lacking and users demand higher speed services in the mobile communication system providing a current service, a more advanced mobile communication system is needed.

To meet these demands, standardization of Long Term Evolution (LTE) is being progressed by the 3$^{rd}$ Generation Partnership Project (3GPP) as one of the next generation mobile communication systems that are being developed. LTE is a technology of implementing high speed packet based communication with a transmission rate of up to about 100 Mbps. To this end, several methods are being discussed, including a method of reducing the number of nodes located on a communication channel by simplifying a network architecture, a method of making wireless protocols closely access a wireless channel to the maximum, and the like.

Meanwhile, in recent years, a UE has appeared to which both a communication function (hereinafter, referred to as 3GPP or LTE) of receiving a communication service through the existing service provider network and a function of accessing the WLAN are provided. The WLAN can be used for providing a provider network service while being connected to the service provider network or for providing an Internet service while being directly connected to an Internet network.

SUMMARY

To address the above-discussed deficiencies, it is a primary object to provide a control method of automatically switching on/off the WLAN when a WiFi function is additionally mounted to a 3GPP communication function of a UE. When an available WLAN does not exist around a user, if a WLAN is switched on, the WLAN performs an unnecessary operation, and thus, can consume a battery of the UE, or the WLAN performs unnecessary calculation, and thus, can reduce performance of the UE. However, even when an available WLAN exists around the user, when a WiFi function of the UE is switched off, the WLAN is available, but cannot be used.

A method of supporting handover of a UE by a Mobility Management Entity (MME) of a mobile communication system according to an embodiment of the present specification is provided. The method includes receiving, from an eNB, a first message for handover to another network. The first message includes information on a cell to which the UE is handed over. The method also includes transmitting, to a server, a second message for reporting information related to a location of the UE on the basis of the first message and providing a location continuity.

A method of supporting handover of a UE by an eNB of a mobile communication system according to another embodiment of the present specification is provided. The method includes receiving, from the UE, a first message for handover of the UE. The method also includes transmitting, to an MME, a second message for handover to another network. The second message includes information on a cell to which the UE is handed over on the basis of the first message. The MME transmits, to a server, a third message for reporting information related to a location of the UE on the basis of the second message and providing a location continuity.

An MME for supporting handover of a UE in a mobile communication system according to another embodiment of the present specification is provided. The MME includes a transmission and reception unit configured to transmit and receive a signal to and from at least one of an eNB and a server. The MME also includes a controller. The controller is configured to control the transmission and reception unit. The controller is also configured to receive, from the eNB, a first message for handover to another network. The first message includes information on a cell to which the UE is handed over. The controller is also configured to transmit, to the server, a second message for reporting information related to a location of the UE on the basis of the first message and providing a location continuity.

An eNB for supporting handover of a UE in a mobile communication system according to yet another embodiment of the present specification is provided. The eNB includes a transmission and reception unit configured to transmit and receive a signal to and from at least one of UE and a MME. The eNB also includes a controller. The controller is configured to control the transmission and reception unit. The controller is also configured to receive, from the UE, a first message for handover of the UE. The controller is further configured to transmit, to the MME, a second message for handover to another network. The second message includes information on a cell to which the UE is handed over on the basis of the first message. The MME is also configured to transmit, to a server, a third message for reporting information related to a location of the UE on the basis of the second message and providing a location continuity.

A UE according to an embodiment of the present specification, to which both a 3GPP communication function and a WiFi function is provided. The UE is configured to automatically switch on and off a WLAN function according to a location, a setting, and a pattern of a user, thereby preventing unnecessary battery consumption or performance deterioration. The UE is also configured to search for an available WLAN in advance to access the WLAN.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
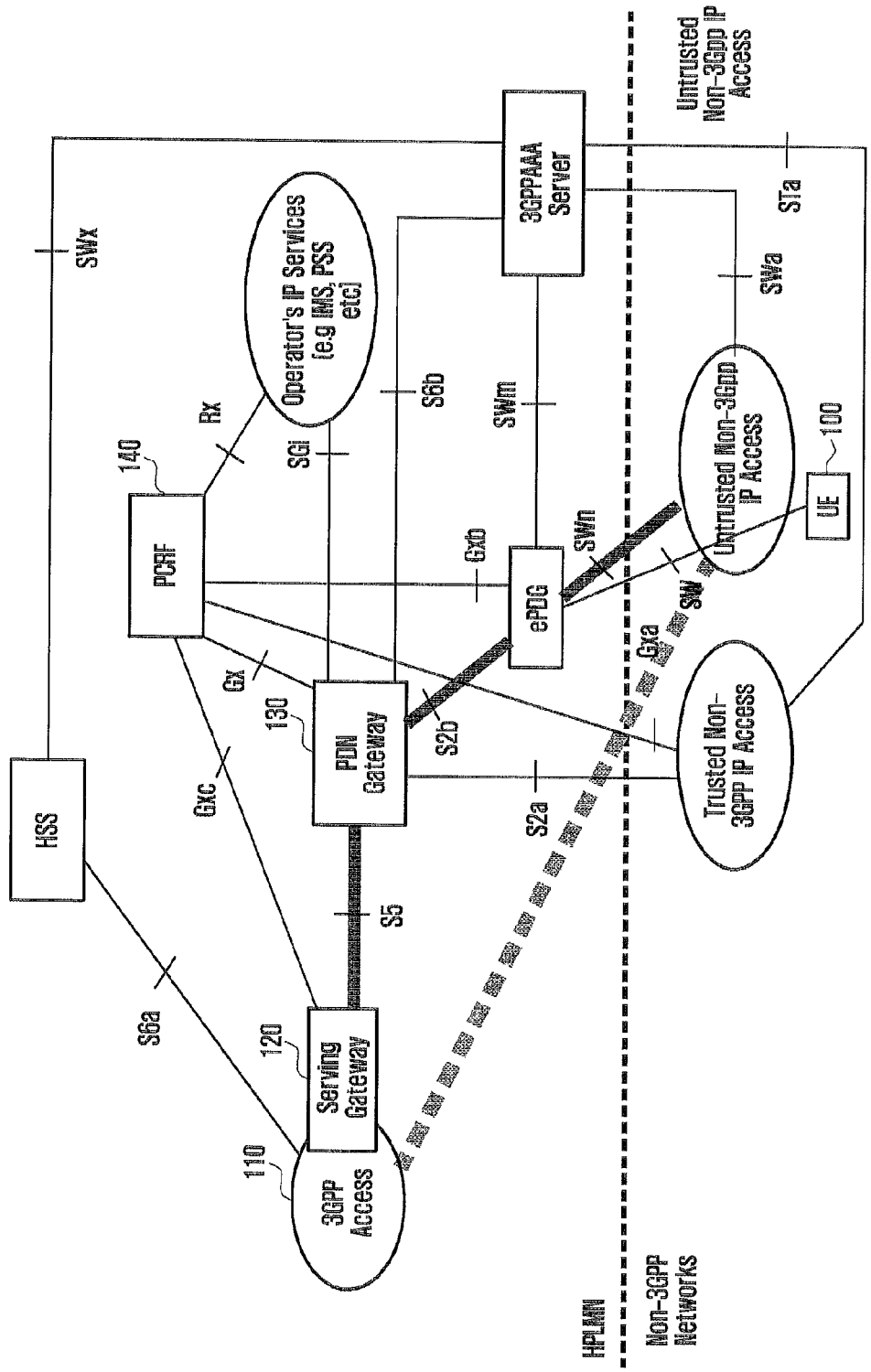
FIG. 1 illustrates an example structure of a mobile communication system according to this disclosure.

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. Hereinafter, an embodiment of the present disclosure will be described in detail with reference to the accompanying drawings.

In describing the exemplary embodiments of the present disclosure, descriptions related to technical contents which are well-known in the art to which the present disclosure pertains, and are not directly associated with the present disclosure, will be omitted. Such an omission of unnecessary descriptions is intended to prevent obscuring of the main idea of the present disclosure and more clearly transfer the main idea.

Also, in describing the present disclosure, a wireless LAN can be used as the same meaning as WiFi, WLAN, and the like.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which executes via the processor of the computer or other programmable data processing apparatus, creates a means for implementing the functions specified in the flowchart block or blocks. These computer program instructions are also stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions are also loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations can represent a module, segment, or portion of code, which includes one or more executable instructions for implementing the specified logical function(s). It should also be noted that in some alternative implementations, the functions noted in the blocks can occur out of the order. For example, two blocks shown in succession can in fact be executed substantially concurrently or the blocks can sometimes be executed in the reverse order, depending upon the functionality involved.

As used herein, the "unit" or "module" refers to a software element or a hardware element, such as a Field Programmable Gate Array (FPGA) or an Application Specific Integrated Circuit (ASIC), which performs a predetermined function. However, the "unit" or "module" does not always have a meaning limited to software or hardware. The "unit" or "module" can be constructed either to be stored in an addressable storage medium or to execute one or more processors. Therefore, the "unit" or "module" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" or "module" can be either combined into a smaller number of elements, "unit", or "module" or divided into a larger number of elements, "unit", or "module". Moreover, the elements and "units" or "modules" can be implemented to reproduce one or more CPUs within a device or a security multimedia card.

Communication entities of the overall embodiments include a transmission and reception unit for transmitting and receiving a signal to and from another communication entity, a storage unit for storing transmitted and received information in the communication entity, and a controller for controlling the transmission and reception unit and an operation of the communication entity.

In the following description of embodiments of the present disclosure, a detailed description of known functions or configurations incorporated herein will be omitted when it is determined that the detailed description thereof may unnecessarily obscure the subject matter of the present disclosure.

Further, in the detailed description of embodiments of the present specification, a main target to be described is a basic 3$^{rd}$ Generation Partnership Project (3GPP) Long Term Evolution (LTE) system and a terminal. However, embodiments of the present disclosure can be also applied to other communication/computer systems having a similar technical field and a similar system form without greatly departing from the scope of the embodiments of the present specification, and this application can be performed on the basis of the determination of those skilled in the art.

Further, a WiFi function and a Wireless Local Area Network (WLAN) used in the overall embodiments can mean WLAN connection, a technology of connecting devices, and a device, which are based on IEEE 802.11. Further, the embodiments disclosed here are not applied only to the described communication network, and can be used for overall control of a terminal which can access networks using different communication schemes.

Further, in the overall embodiments, a UE and a terminal can be used together. FIG. 1 illustrates an example structure of a mobile communication system to this disclosure.

Referring to FIG. 1, as illustrated, a wireless access network of the LTE mobile communication system includes a next-generation base station (Evolved Node B or EUTRAN; hereinafter, referred to as an eNB or a Node B) 130, a Mobility Management Entity (MME) and a Serving-GateWay (S-GW) 120. A User Equipment (hereinafter, referred to as a UE) 100 accesses an external network through the eNB, the S-GW 120, and a PDN-GateWay (P-GW) 130.

The eNB corresponds to an existing node B of a Universal Mobile Telephone System (UMTS). The eNB is connected with the UE 100 through a wireless channel, and performs a more complicated role than the conventional node B. In FIG. 1, it is assumed that the eNB is included in a block of a 3GPP Access 110. A base station node such as an eNB, a node B, or the like, periodically transmits system information, and a block of the system information is transmitted while including a cell identity by which a cell can be identified.

In the LTE system, since all user traffic including a real time service such as a Voice over IP (VoIP) through an Internet Protocol (IP) are serviced through a shared channel, an apparatus for collecting and scheduling status information of UEs is required, and the eNB serves as this apparatus.

The S-GW 120 is an apparatus for providing a data bearer, and generates or removes a data bearer under a control of the MME.

The MME is an apparatus which is in charge of various control functions, and one MME can be connected to a plurality of eNBs.

A PCRF 140 is an apparatus for controlling a policy related to a Quality of Service (QoS) and billing.

As illustrated in the drawing, the mobile communication system performs accessing by using a Non-3GPP access network 145 such as a WiFi, WiMAX and CDMA2000 (mentioned as an Evolved Packet Data Gateway or referred to as a second wireless network, hereinafter both are used together) as well as a 3GPP access network such as LTE (or referred to as a first wireless network, hereinafter both are used together). The WiFi system is used as a path which is not connected to the mobile communication system, and is directly connected to an Internet network so as to transmit and receive data between the UE and the Internet.

Now, embodiments of the present disclosure will be described with reference to the accompanying drawings. The drawings are tools for helping understanding of the embodiments of the present disclosure, and a main subject matter of the present disclosure can be applied even when a part of the drawings is omitted or a part is added to the drawings.

The embodiments of the present disclosure relate to a control method of automatically switching on and off an apparatus such as WiFi) which performs communication with a non-3GPP communication network when a non-3GPP function (such as WiFi) is additionally mounted to a 3GPP communication function of the UE. When an available WLAN does not exist around a user, if a WiFi function is switched on, the WiFi function performs an unnecessary operation, and thus, consumes a battery of the UE, or the WiFi function performs unnecessary calculation, and thus, reduces performance of the UE. Herein, the operation or the calculation of the WiFi function includes a process of receiving a beacon message transmitted by a WLAN Access Point (AP) or transmitting a probe message while the UE moves through various WLAN channels, and a data processing process for transmitting and receiving these messages. However, even when an available WLAN exists around the user, when a WiFi function of the UE is switched off, the WLAN function is available, but cannot be used.

In order to reduce such an inconvenience of a user, the present disclosure provides a control method of automatically switching on and off a WiFi function on the basis of a location or a use pattern of the user. In more detail, according to an embodiment of the present disclosure, the UE records information of a specific WLAN configured by a user (herein, the WLAN can be configured by one access point or a plurality of access points) and 3GPP cells overlapping an area of the WLAN, and switches on off a WiFi function on the basis of the information.

Figure 2:
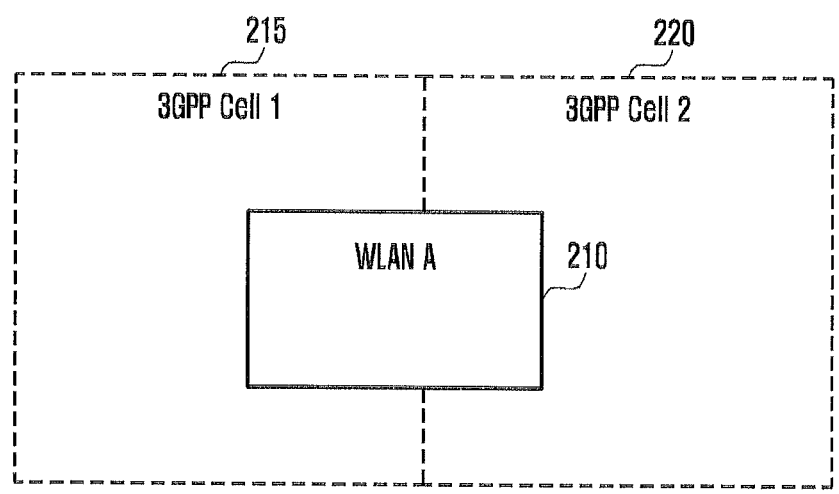
FIG. 2 illustrates an example coverage of a WLAN and an example coverage of an eNB according to this disclosure.

FIG. 2 illustrates an example coverage of a WLAN and an example coverage of an eNB according to this disclosure.

As illustrated in FIG. 2, when a user permits a specific WLAN (WLAN A in the drawing) 210 to use an automatic WLAN control function, the UE detects an area of a 3GPP cell overlapping the coverage of the WLAN (Cell 1 215 and Cell 2 220 in the drawing), and stores these pieces of cell information together with WLAN information. When a user moves, if the UE accesses the WLAN A 210 still and detects a cell not stored beforehand, information of the detected cell is added.

Through these processes, the UE manages information of the 3GPP cells overlapping the area of the WLAN, and switches off the WiFi function when a user moves, thus cannot access the WLAN anymore, and deviates from the area of the 3GPP cells. Further, when the WLAN is switched off, if a user moves and enters the area of the 3GPP cell, the UE switches on the WiFi function, firstly detects whether there is the stored WLAN, and accesses the WLAN.

According to an embodiment of this disclosure, the UE performs an operation of automatically switching on and off the WiFi function according to a configuration of a user. As an example, when it is assumed that a user can configure whether to use the WiFi function or not under a control of the terminal, the UE shows the user a configuration window to ask whether to use a WiFi automatic control function, and stores a result (permission or prohibition) selected by the user. Further, in a specific implementation example of the UE, the WiFi function, which can be configured by a user, includes one or more of three options (WiFi Off, WiFi On, and WiFi auto-control). When a user selects the WiFi Off or the WiFi On, the WiFi automatic control function does not operate. Only when a user selects the WiFi auto-control, the aforementioned WiFi automatic switching-on and off control function can be applied. Further, some embodiments can determine whether to use a WiFi module under the control of the UE even without such a configuration.

A process of collecting and storing information for applying the WiFi automatic control function will be described according to this disclosure.

In an embodiment, a UE determines whether to apply the WiFi automatic control function to an accessed WLAN, according to a configuration of a user. In another embodiment, a user configures whether to apply the WiFi automatic control function to a currently-accessed WLAN, through a configuration screen.

When the WiFi automatic control function is permitted, the UE stores WLAN information and a cell identity received through the 3GPP communication function together. Here, the WLAN information includes at least one of an identity (SSID, BSSID, ESSID, or the like) of the WLAN, authentication information (ID, password, key, or the like) used during WLAN access, a frequency or a channel number at which the WLAN operates, and a form (802.11a or 802.11g) of the WLAN. Further, in an embodiment, the UE performs the 3GPP communication function and thereby can store a Cell ID received by communication with the eNB, and the WiFi access information together. Thus, the UE determines whether to operate a function of a module (WiFi module) relating to the WLAN access, on the basis of the Cell ID which performs current communication.

Further, in an embodiment, the UE can additionally store a Cell ID of a cell at the same location as that of a WLAN which a user prefers, and when being located at a cell having the Cell ID, the UE can access the WLAN.

Figure 3:
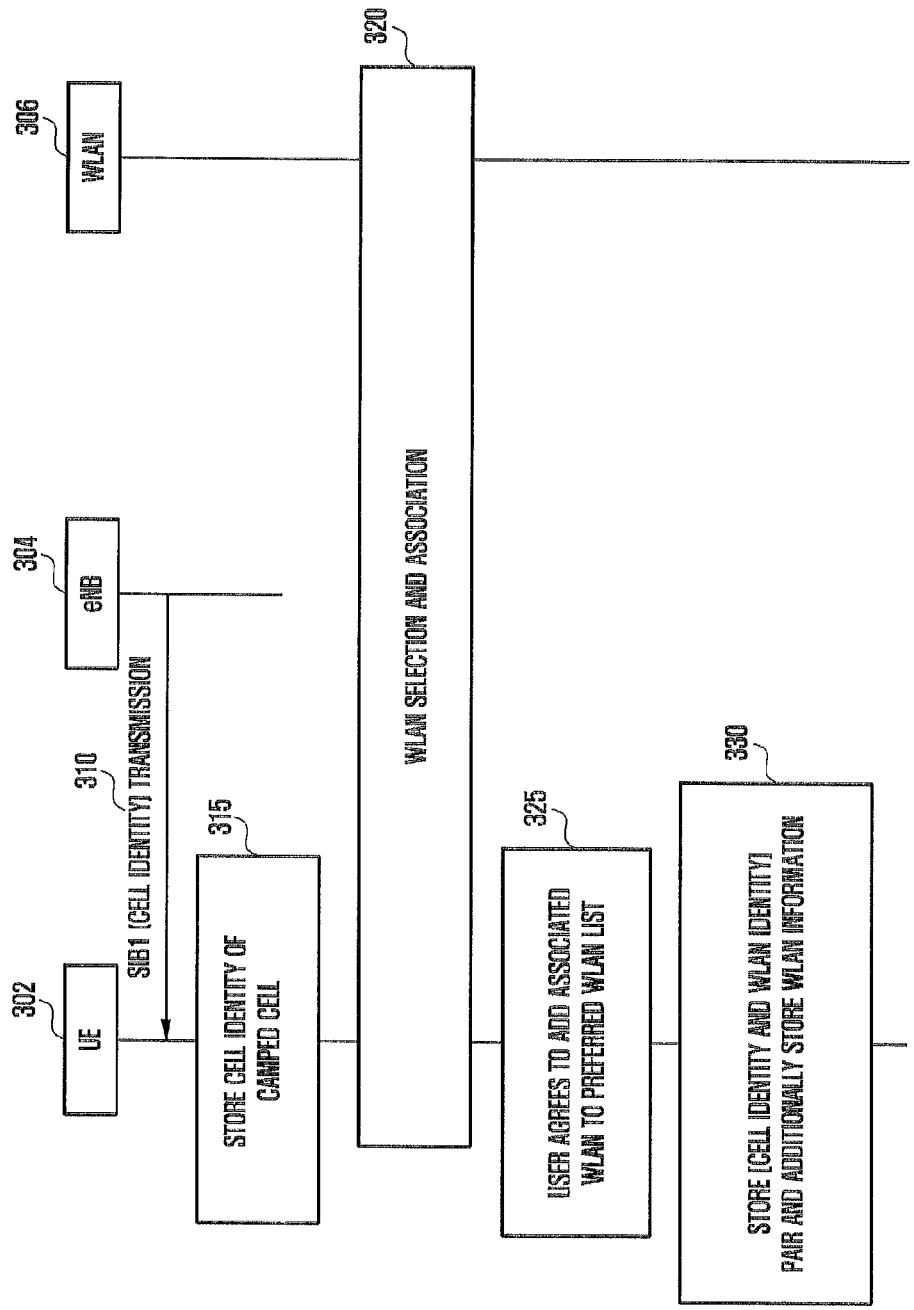
FIG. 3 is a signal flow diagram illustrating an example process of transmitting and receiving a signal between a terminal, an eNB, and a WLAN according to this disclosure.

FIG. 3 is a signal flow diagram illustrating an example process of transmitting and receiving a signal between a terminal, an eNB and a WLAN according to this disclosure. In more detail, FIG. 3 is a signal flow diagram illustrating an example process of receiving a cell identity and storing the cell identity for the WiFi automatic control.

Referring to FIG. 3, one or more of a UE 302, an eNB 304 and a WLAN 306 transmits and receives a signal to and from another entity.

The UE 302 receives system information from the eNB 304 while being camped on or connected to a 3GPP cell (E-UTRAN, UTRAN, GERAN, or the like), in step 310. The UE 302 identifies an identity of a cell through the system information. Further, the UE 302 stores a Cell ID of a camped-on cell on the basis of the system information, in step 315. The UE 302 stores the Cell ID so as to determine a location thereof on the basis of the Cell ID.

In step 320, the UE 302 is connected to the WLAN 306.

In step 325, a user access a specific WLAN while switching on a WiFi function of the UE 302 and the user configures the corresponding WLAN as a WLAN-to-automatically-control-WiFi (in the drawing, expressed as a "Preferred WLAN"). Then, in step 330, the UE adds the WLAN to a list of the WLAN-to-automatically-control-WiFi, and stores the received 3GPP cell identity together.

In more detail, the UE 302 stores an identity of the WLAN 306 and a Cell ID of a cell camped on when being connected to the WLAN 306, and thereby determines whether the WLAN 306 is connected or not, according to the stored Cell ID.

As discussed herein, the UE stores at least one of identities (SSID, BSSID, ESSID, or the like) of the WLAN, authentication information (ID, password, key, or the like) used during WLAN access, a frequency, or a channel number at which the WLAN operates, and a form (802.11a or 802.11g) of the WLAN, together. The above description is merely one flow for describing a main subject matter of the present disclosure, and element operations of each step can be performed in a different sequence. That is, according to an embodiment of the present disclosure, WiFi automatic control WLAN can be expressed by the following information.

Identities (SSID, BSSID, ESSID, or the like) of automatic control WLAN

List of identities of 3GPP cells overlapping area of WLAN

Information related to WLAN access
    Authentication information (ID, password, key, or the like)
    Information of frequency and channel at which WLAN operates
    Types of WLAN (802.11a/b/g, or the like)

Identity list of 3GPP cells in which WLAN should not be switched off

Meanwhile, when the WiFi automatic control function is activated and there are one or more WiFi automatic control WLANs, the WiFi function is controlled on the basis of stored WiFi automatic control WLAN information. When the WiFi function is switched off, if a 3GPP cell included in the WiFi automatic control WLAN information is detected according to movement of a user, a probability that the WiFi automatic control WLAN exists near the user is high, and therefore, the WiFi function can be switched on. Further, on the basis of the aforementioned WiFi storage information, the WLAN having a specific identity can be searched for or a specific frequency and channel can be preferentially accessed. Further, when an authentication process is required, authentication can be automatically performed using ID, password, key, or the like which are stored.

Meanwhile, in a case where the WiFi automatic control function is activated, when it is determined whether the WiFi automatic control WLAN exists near a user, one or more combinations of identities of the WLAN can be used. For example, a user can include only an AP having a specific MAC address (BSSID or HESSID) among WLANs having an SSID called "MyHomeWLAN", in the WiFi automatic control WLAN. Such a combination of different types of identities are configured, when there are two WLANs having the same singular identity (such as when two different APs use the same SSID), to apply automatic control by selecting only one WLAN which a user can actually use.

Figure 4:
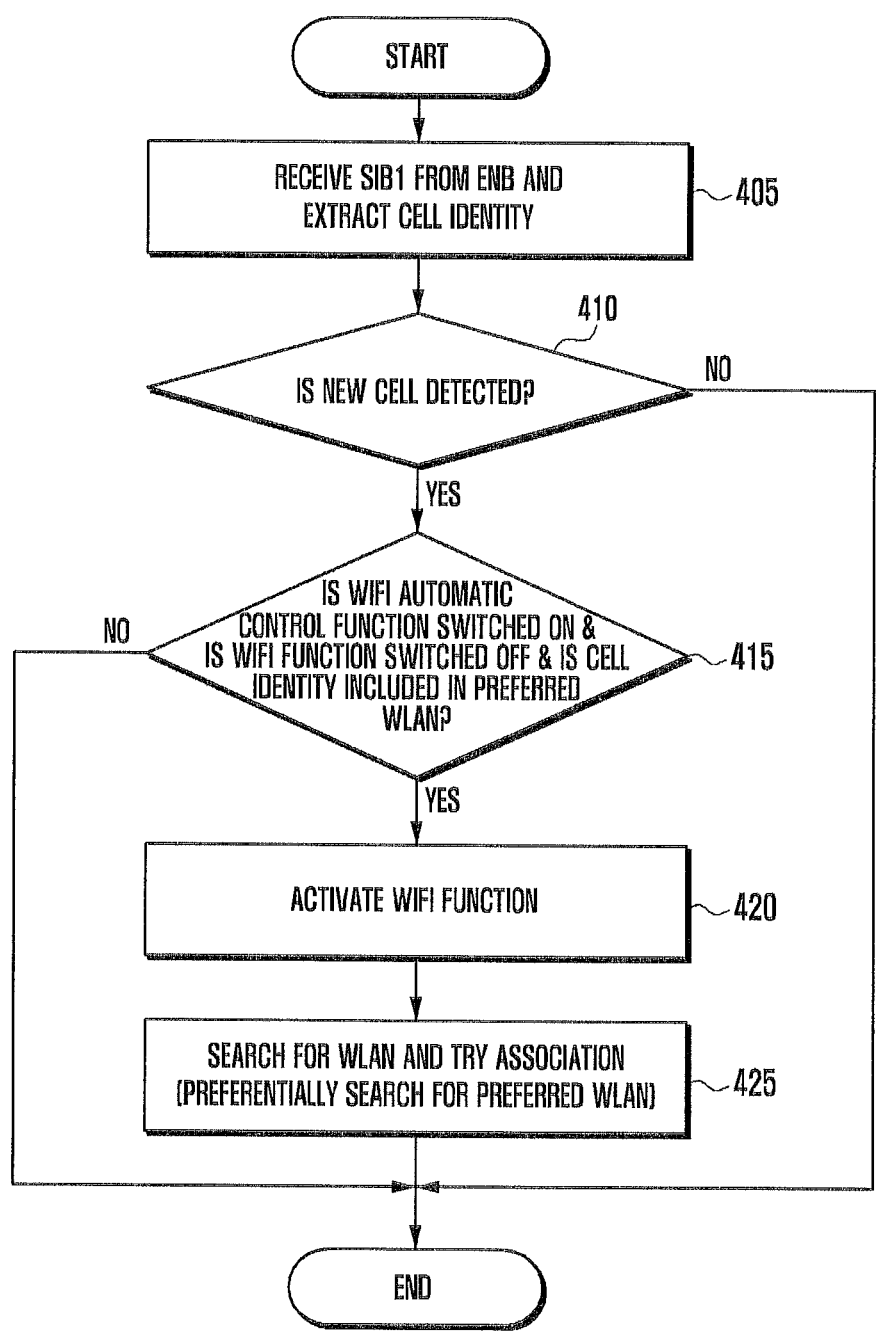
FIG. 4 is a flowchart illustrating an example operation of a terminal according to this disclosure.

FIG. 4 is a flowchart illustrating an example operation of a terminal according to this disclosure. In more detail, FIG. 4 is a flowchart illustrating an operation of a terminal automatically activating a WiFi function according to stored information in a state in which the WiFi function been deactivated. Referring to FIG. 4, in step 405, a UE receives system information from an eNB, and acquires a Cell ID of an accessed cell on the basis of the received system information. In more detail, the UE receives a System Information Block (SIB) for camping to extract a cell identity, in an idle mode, and identifies an identity of a cell which the UE accesses, even in a connection mode.

When a new cell is detected (that is, when the current cell is camped to a new cell by an idle mode mobility, or the UE is handed over to a new cell in a connection mode), in step 410, the UE determines whether one or more of the following conditions are satisfied, in step 415.

Is the WiFi automatic control function activated?, and Is there one or more WiFi automatic control WLANs?
Is the WiFi function of a current terminal deactivated?
Is a newly-detected identity of a cell included in a list of identities of 3GPP cells overlapping an area of the WLAN, the 3GPP cell being included in the stored WiFi automatic control WLAN information?

When one or more of the conditions are satisfied, the UE anticipates that there is a WLAN, which a current user prefers, near the user, and thus, activates the WiFi function, in step 420.

Further, in step 425, when information of one or more of identities (SSID, BSSID, ESSID, or the like) of a WLAN, authentication information (ID, password, key, or the like) used at a time of WLAN access, a frequency or a channel number at which the WLAN operates, and a form (802.11a or 802.11g) of the WLAN is stored in the WiFi automatic control WLAN information, the UE can shorten a WLAN search and connection time, or can simplify the authentication. Meanwhile, the above description is merely one flow for describing a main subject matter of the present disclosure, and element operations of each step can be performed in a different sequence.

Meanwhile, as aforementioned, when the WLAN is located at a boundary of a cell, there can be one or more cells overlapping an area of one WLAN. This case can appear more frequently when various WLAN APs configure the same WLAN (that is, when various APs use the same identity). A case where there are a plurality of 3GPP cells overlapping an area of the WLAN corresponds to a case where, in a state where connection of the corresponding WLAN is maintained (that is, conditions in which a beacon can be received from the WLAN, association can be maintained, the intensity of a reception signal is larger than a predetermined level, and the like, are satisfied), the current cell is camped on or connected to a 3GPP cell which is not stored in the WiFi automatic control WLAN information, the identity of the corresponding cell is added to the list of the identities of the 3GPP cells overlapping the area of the WLAN, the 3GPP cell being included in the WiFi automatic control WLAN information.

Figure 5:
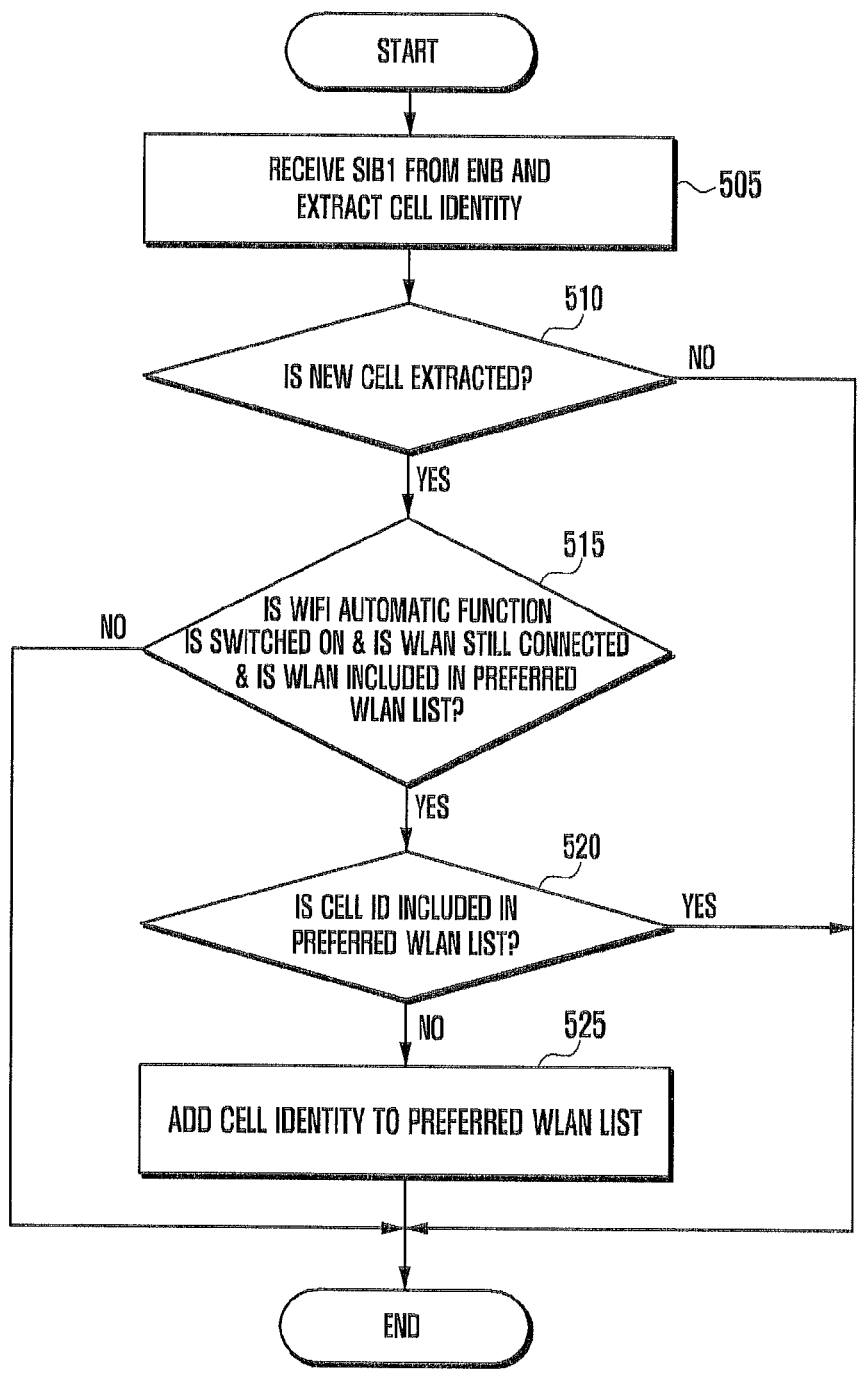
FIG. 5 is a flowchart illustrating an example operation of a terminal according to this disclosure.

FIG. 5 is a flowchart illustrating an example operation of a terminal according to this disclosure. In more detail, FIG. 5 illustrates a process of adding a 3GPP cell identity to information on a specific WiFi automatic control WLAN according to this disclosure.

Referring to FIG. 5, in step 505, a UE receives system information from an eNB, and acquires a Cell ID of an accessed cell on the basis of the received system information. In more detail, the UE receives a System Information Block (SIB) for camping to extract a cell identity, in an idle mode, and identifies an identity of a cell which the UE accesses, even in a connection mode. When it is determined in step 510 that a new cell is detected (that is, the current cell is camped to a new cell by an idle mode mobility, or the UE is handed over to a new cell in a connection mode), the UE examines whether one or more of the following conditions are satisfied, in step 515.

Is the WiFi automatic control function activated and are there one or more WiFi automatic control WLANs?
Is association with one WLAN maintained currently?
Is a currently-accessed WLAN included in the WiFi automatic control WLAN?

When one or more of the above conditions are satisfied, the UE anticipates that a WLAN, which a current user prefers, exists near the user, and identifies whether a detected new cell identity is included in the WiFi automatic control WLAN information, in step 520. When the new cell identity is not included in the WiFi automatic control WLAN information, this means that a 3GPP cell overlapping the area of the currently-preferred WLAN should be added. Thus, the UE adds the cell identity to the list of identities of the 3GPP cells overlapping the area of the WLAN, the 3GPP cell being included in the WiFi automatic control WLAN information, in step 525. Meanwhile, the above description is merely one flow for describing a main subject matter of the present disclosure, and element operations of each step can be performed in a different sequence.

Meanwhile, according to an embodiment of the present disclosure, when the WiFi automatic control function is activated, and the UE deviates from the area of the 3GPP cell where it is anticipated that the WiFi automatic control WLAN exists, the UE automatically deactivates the WiFi function.

Figure 6:
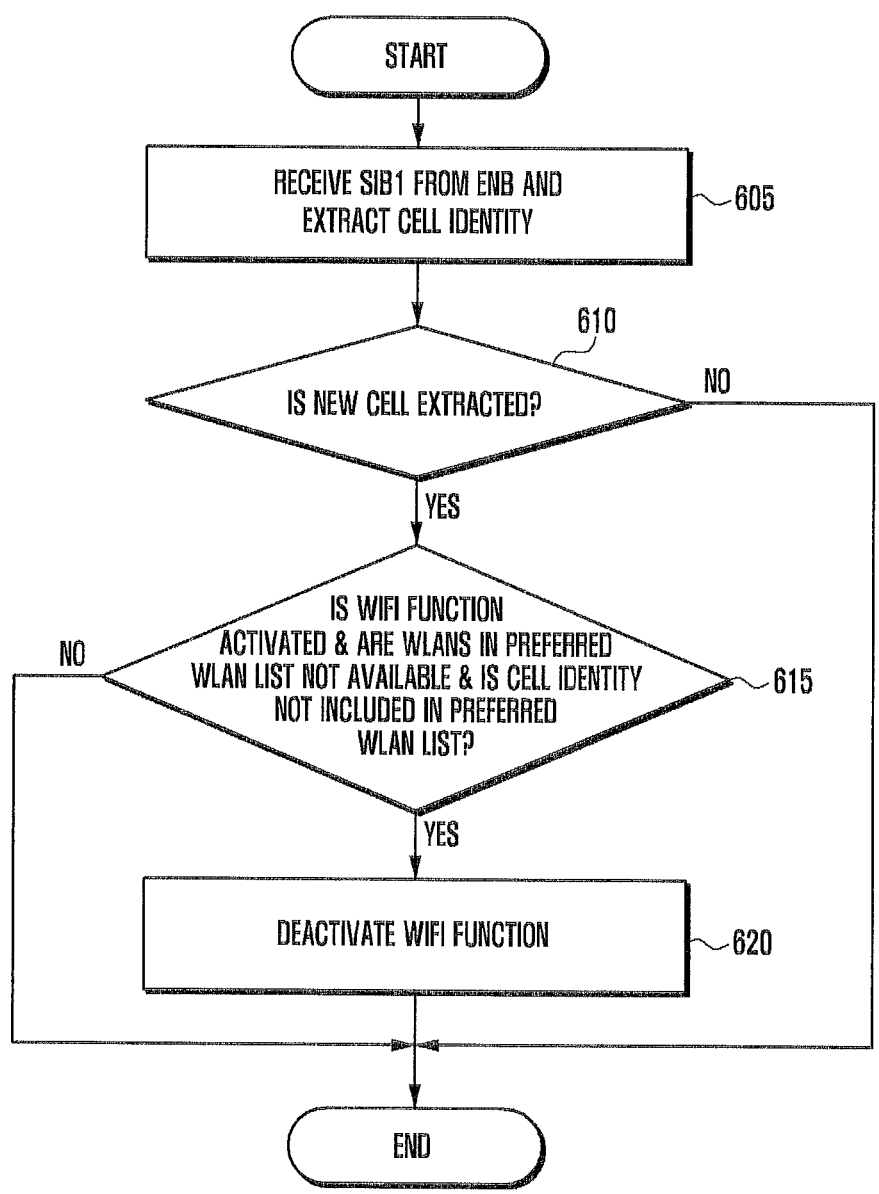
FIG. 6 is a flowchart illustrating an example operation of a terminal according to this disclosure.

FIG. 6 is a flowchart illustrating an operation of a terminal according to this disclosure. In more detail, FIG. 6 is a flowchart illustrating a process of automatically deactivating a WiFi function according to this disclosure.

Referring to FIG. 6, in step 605, a UE receives system information from an eNB, and acquires a Cell ID of an accessed cell on the basis of the received system information. In more detail, the UE receives a System Information Block (SIB) for camping to extract a cell identity, in an idle mode, and identifies an identity of a cell which the UE accesses, even in a connection mode.

When it is determined in step 610 that a new cell is detected (that is, the current cell is camped to a new cell by an idle mode mobility, or the UE is handed over to a new cell in a connection mode), the UE examines whether one or more of the following conditions are satisfied in step 615.

Is the WiFi automatic control function activated?
Is it impossible to access all of the currently-stored WiFi automatic control WLANs?
Is a detected new cell identity not included in the list of identities of the 3GPP cells overlapping the area of the WLAN for the stored WiFi automatic control WLANs When one or more of the above conditions are satisfied, the UE anticipates that a WLAN, which a current user prefers, does not exist near the user, and the UE deactivates the WiFi function, in step 620. Meanwhile, the above description is merely one flow for describing a main subject matter of the present disclosure, and element operations of each step can be performed in a different sequence.

Meanwhile, a provider network, through which the UE receives a service, can be configured by various Radio Access Technologies (RATs). In more detail, a provider network, which provides an LTE (E-UTRAN) service, can use 2G/3G legacy based on GERAN or UTRAN together in order to resolve a phone call or a radio shadow area. For example, when a phone call service is provided to a user, a provider, which provides a data service by using the LTE, temporarily moves the UE to a 2G network or a 3G network to receive a service. When the WiFi automatic control function is activated, if the WiFi access is disconnected due to such a temporary change in the RAT, a service quality which a user feels may be decreased. Thus, in an embodiment of the present disclosure, when the WiFi automatic control function is activated, and the provider network is configured by various RATs, the UE needs to separately manage a list of identities of cells in which the WiFi function needs not be deactivated. That is, when the WiFi automatic control function is activated, the UE is accessing the WiFi automatic control WLAN, and the UE moves to a cell of a temporarily overlapping secondary RAT, the UE does not deactivate the WiFi function.

It can be configured which one becomes a primary RAT and which one becomes a secondary RAT, from various RATs constituting the provider network. For example, in case of a general LTE terminal, the primary RAT can be configured to be LTE, and the secondary RAT can be configured to be UTRAN or GERAN. An identity of a cell of the primary RAT can be included in the list of identities of the 3GPP cells overlapping the area of the WLAN, the 3GPP cells being included in the aforementioned WiFi automatic control WLAN information, and the WiFi function can be activated or deactivated on the basis of the list. An identity of a cell of the secondary RAT can be included in the list of identities of the 3GPP cells in which the WLAN should not be switched off, the 3GPP cells being included in the aforementioned WiFi automatic control WLAN information, and when moving to a cell included in the list, the UE needs not deactivate the WiFi function.

Figure 7:
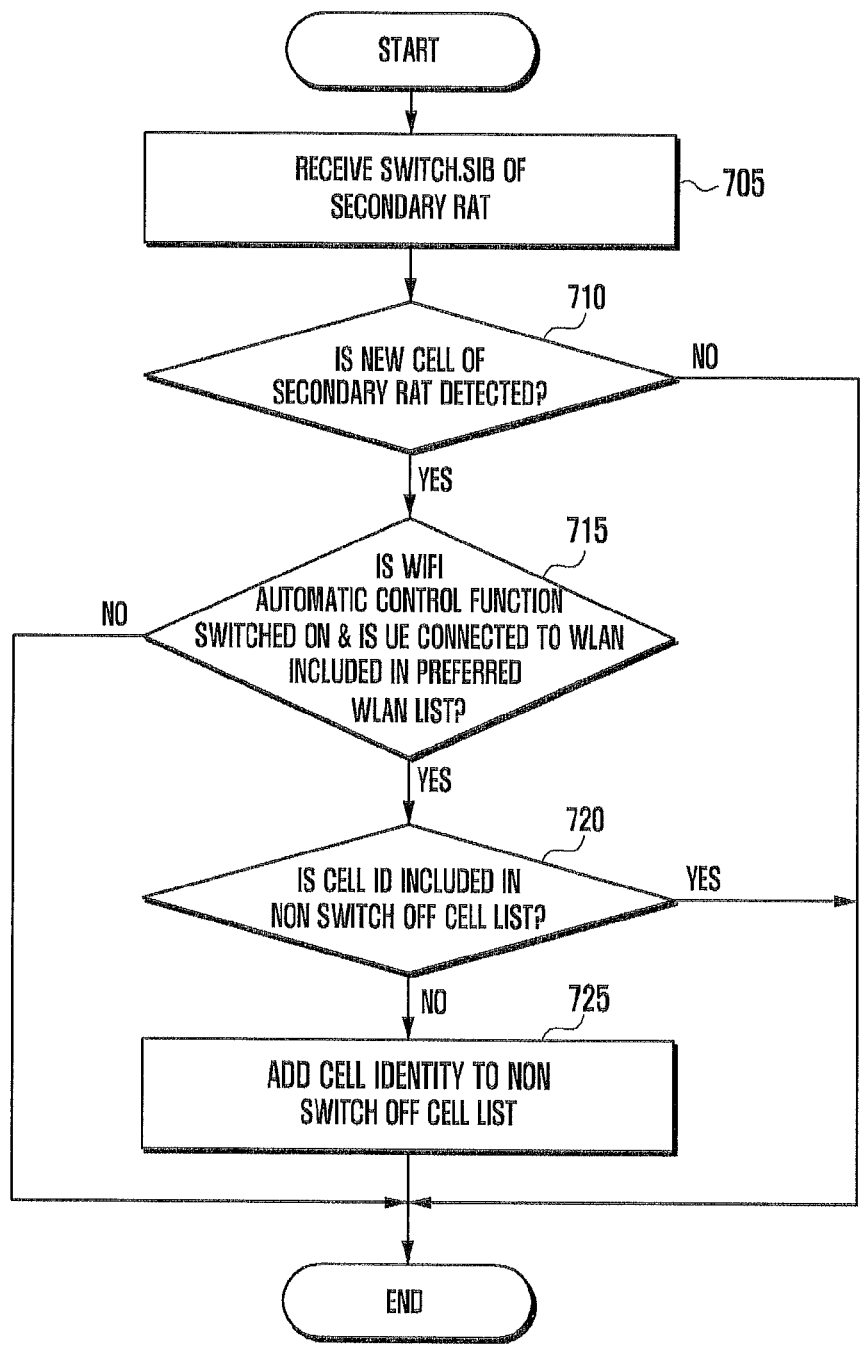
FIG. 7 is a flowchart illustrating an example operation of a terminal according to this disclosure.

FIG. 7 is a flowchart illustrating an example operation of a terminal according to this disclosure. In more detail, FIG. 7 is a flowchart illustrating an operation of, when the UE detects a cell of a secondary RAT, including the detected cell in the list of identities of the 3GPP cells in which the WLAN should not be switched off, according to an embodiment of the present specification.

Referring to FIG. 7, in step 705, a UE receives system information from an eNB, and acquires a Cell ID of an accessed cell on the basis of the received system information. In more detail, the UE receives an SIB of a secondary RAT in order to perform camping and extracts a cell identity, in an idle mode, and finds an identity of a cell of the secondary RAT which the UE itself accesses, even in a connection mode.

In an embodiment, a case where the UE moves to the secondary RAT includes one or more of a case where a user directly changes a selection priority of RATs, a case where a provider network changes a RAT priority for the UE, and a case where a command is received from an eNB due to a CS FallBack (CSFB) or handover is provided.

When it is determined in step 710 that a new cell is detected (that is, the current cell is camped to a new cell of the secondary RAT by an idle mode mobility, or the UE is handed over to a new cell of the secondary RAT cell in a connection mode), the UE examines whether one or more of the following conditions are satisfied, in step 715.

Is the WiFi automatic control function activated?
Is the UE connected to one of the WiFi automatic WLANs?

When one or more of the above conditions are satisfied, in step 720, the UE examines whether a detected identity of a cell of the secondary RAT is included in the list of identities of the 3GPP cells in which the WLAN should not be switched off, the 3GPP cells being included in the WiFi automatic control WLAN information. When the detected identity of the cell of the secondary RAT is not included in the list of identities, it can be seen that the cell of the secondary RAT, which the UE can access temporarily, exists near the WiFi automatic control WLAN and it is preferred that the WiFi function is not deactivated in this cell. Thus, in step 725, the UE includes the detected cell of the secondary RAT in the list of identities of the 3GPP cells in which the WLAN should not be switched off, the 3GPP cells being included in the WiFi automatic control WLAN information. Meanwhile, the above description is merely one flow for describing a main subject matter of the present disclosure, and element operations of each step can be performed in a different sequence.

Figure 8:
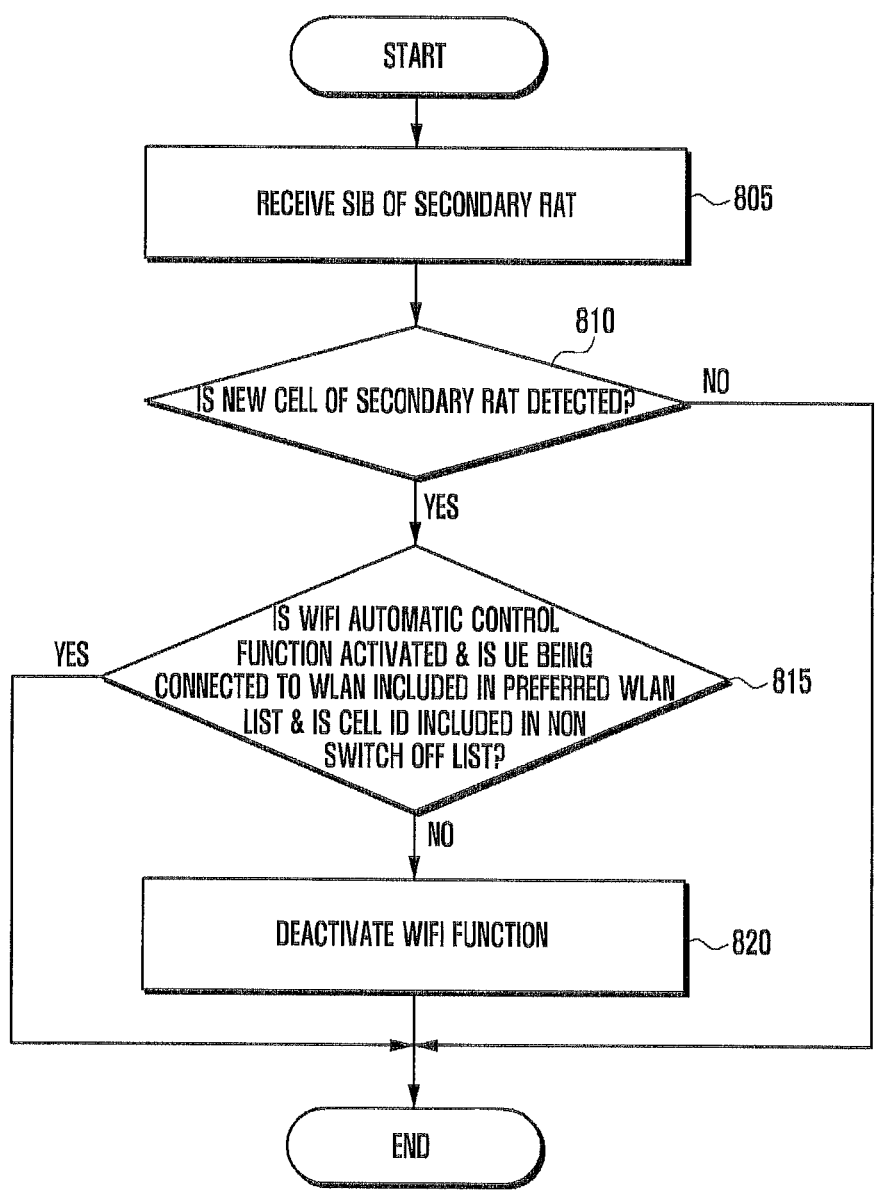
FIG. 8 is a flowchart illustrating an example operation of a terminal according to this disclosure.
Figure 9:
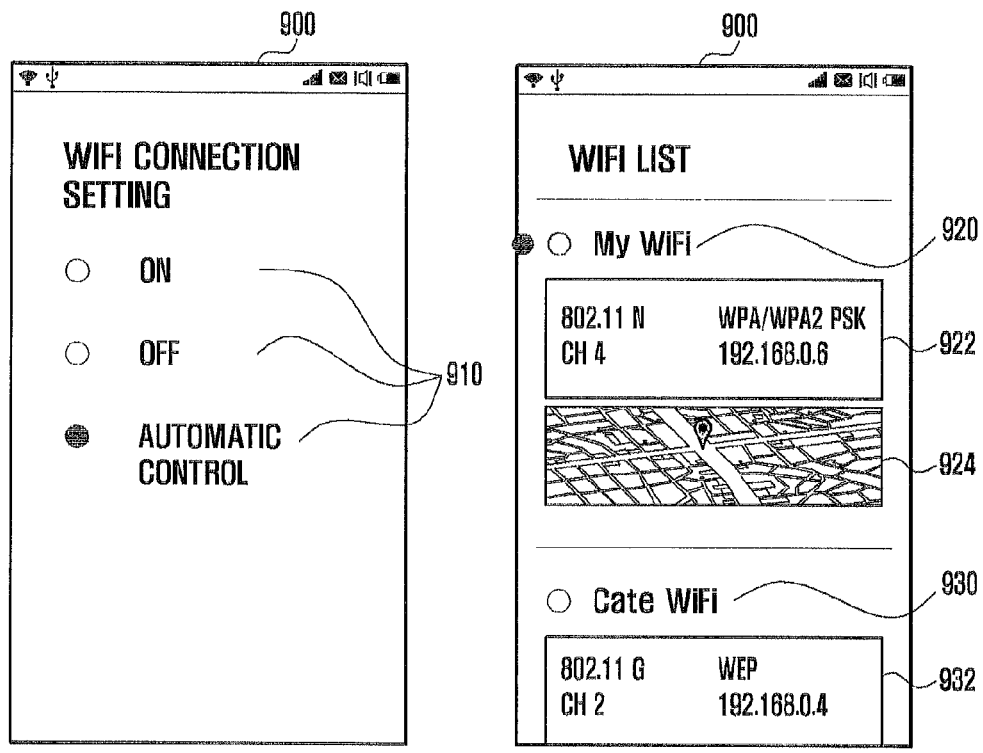
FIGS. 9A and 9B illustrate examples of a User Interface (UI) of a terminal according to this disclosure.

FIG. 8 is a flowchart illustrating an example operation of a terminal according to this disclosure. In more detail, FIG. 8 is a flowchart illustrating an operation of, when the UE moves to the cell of the secondary RAT, controlling the WiFi function, according to an embodiment of the present disclosure.

Referring to FIG. 8, in step 805, the UE receives system information from an eNB, and acquires a Cell ID of an accessed cell on the basis of the received system information. In more detail, the UE receives an SIB of a secondary RAT in order to perform camping to extract a cell identity, in an idle mode, and finds an identity of a cell of the secondary RAT which the UE itself accesses, even in a connection mode. A case where the UE moves to the secondary RAT includes one or more of a case where a user directly changes a selection priority of RATs, a case where a provider network changes a RAT priority for the UE, and a case where a command is received from an eNB due to a CS FallBack (CSFB) or handover is provided.

When it is determined in step 810 that a new cell is detected (that is, the current cell is camped to a new cell of the secondary RAT by an idle mode mobility, or the UE is handed over to a new cell of the secondary RAT cell in a connection mode), the UE examines whether one or more of the following conditions are satisfied, in step 815.

Is the WiFi automatic control function activated?
Is the UE connected to one of the WiFi automatic control WLANs?
Is the detected identity of a cell included in the list of identities of the 3GPP cells in which the WLAN should not be switched off, the 3GPP cells being included in the WiFi automatic control WLAN information?

When all of the above conditions are not satisfied (that is, when one or more of the above conditions are not satisfied), the UE determines that the WiFi function needs not to be activated, and deactivates the WiFi function, in step 820. Meanwhile, the above description is merely one flow for describing a main subject matter of the present disclosure, and element operations of each step may be performed in a different sequence.

FIGS. 9A and 9B illustrate examples of a User Interface (UI) of a terminal according to this disclosure.

Referring to FIG. 9A, the UE according to an embodiment displays a state related to an operation of the UE, on a display unit 900. In more detail, referring to FIG. 9A, a user can configure a connection mode related to a WiFi of the UE. When one of modes indicated by reference numeral 910 is selected, the UE operates according to the selected mode. In more detail, when the UE is in an on-mode, the UE always tries to access a WLAN therearound, which the UE can access. Further, when the UE is in an off-mode, the UE may not perform an operation module related to the WiFi. Further, when the UE is in an automatic control mode, if the UE is at a specific (physical or logical) location, the UE determines whether the WiFi function is activated or deactivated. In more detail, when a user is at a stored specific location, the UE determines whether the UE is connected to the WiFi or not, or can perform a related operation. The location can be determined according to a Cell ID acquired from an eNB which the UE accesses. Further, when the UE performs communication with a specific Cell ID, the UE can store one or more of a list of WLANs to be connected, a list of WLANs to be not connected, and a list of WLANs which are connected to and are not to be disconnected from, respectively or integrally.

Further, referring to FIG. 9B, the display unit 900 displays a WiFi list, which a user prefers. In more detail, the display unit 900 displays IDs 920 and 930 of the WLANs which the UE can access, and pieces 922 and 932 of detailed information of the WLAN. The detailed information can include one or more of a communication mode of the WLAN which the UE can access, a security type, a type of a channel used, an IP value, a user ID, a password, and a history of access performing.

Further, the UE displays information related to an area in which the WLAN is accessed, and displays a map (reference numeral 924). The UE determines the information related to the accessed area on the basis of one or more of a separate location identification module of the UE, and an access history of a cell. Further, the UE stores the location information on the basis of the location information received from the WLAN. When a user clicks the location information, the UE displays more detailed location information.

A user can select a specific WiFi list among a list of the displayed WiFi lists. When automatic control is performed, the UE accesses the selected WiFi, and when automatic control is not performed, the user can select the list of the WiFis.

Figure 10:
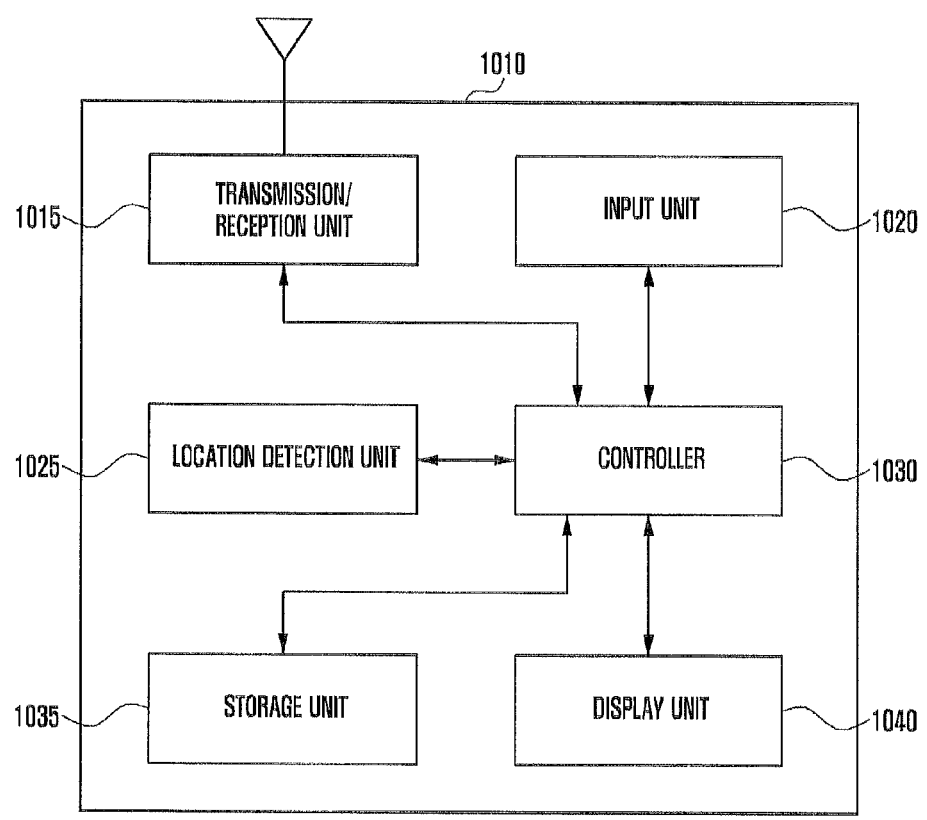
FIG. 10 illustrates an example terminal according to this disclosure.

FIG. 10 illustrates an example terminal according to this disclosure.

Referring to FIG. 10, a UE 1010 according to an embodiment includes one or more of a transmission and reception unit 1050, an input unit 1020, a location detection unit 1025, a controller 1030, a storage unit 1035, and a display unit 1040. In an embodiment, each unit can be implemented by the same module or separate modules, and can perform a hardware function or a software function which corresponds thereto.

The transmission and reception unit 1015 can perform communication with an eNB or another entity. In more detail, the transmission and reception unit 1015 transmits and receives a signal to and from the eNB, the WLAN, and another UE.

The input unit 1020 receives a user input. In more detail, the user input unit includes one or more of a touch screen, a button, a microphone, a tablet, and a proximity illuminance sensor. In an embodiment, one or more of inputs of communication mode selection and WLAN selection of a user can be received through the input unit 1020.

The location detection unit 1025 detects one or more of a logical location and a physical location of the UE. In more detail, the location detection unit 1025 determines a location of the UE on the basis of a Cell ID received from an eNB. Further, the location detection unit 1025 includes a Global Positioning Sensor (GPS) to detect an absolute location of the UE. Further, the location detection unit 1025 identifies the location of the UE on the basis of a content obtained by performing communication with another UE, the eNB, and the WLAN.

The controller 1030 controls an overall operation of the UE, determines whether the UE accesses the WLAN, on the basis of one or more of a communication mode and a WiFi list configured by a user, and adds a WiFi to the WiFi list. Further, the controller controls an operation of the UE.

The storage unit 1035 stores information related to the operation of the UE. The storage unit 1035 includes one or more of a volatile memory and a non-volatile memory, and can include a generally available memory.

The display unit 1040 includes a device for visually displaying the information related to the operation of the UE. Further, the display unit 1040 can be implemented by a display medium such as a Liquid Crystal Display (LCD), a Light Emitting Diode (LED), and an Active Matrix Organic Light Emitting Diode (AMOLED), and an implementation medium of the display unit 1040 is not greatly related to a subject matter of the embodiment.

When the UE deviates from an area where a VoIce MeSsage (VoIMS) service can be supported while the VoIMS service is provided, the UE can be switched to a network which supports a circuit switching (CS) by applying a Single Radio Voice Call Continuity (hereinafter, referred to as "SRVCC"), in order to maintain a call.

Even when a network (or a system) which supports the CS in an area where the UE is provided with a service is 1×RTT (or a similar network using CDMA2000 based 3GPP2 1×CS), the SRVCC scheme can be applied. When the SRVCC is generated, it is necessary to provide continuity for a location service which provides a location of a user of the UE.

In particular, when an ongoing call is an emergency call, provision of the location service and provision of the continuity therefor can be supported by a provider's policy or a region or country's rule.

A method for providing a location service and continuity therefor when an SRVCC proceeds to a 3GPP2 1×CS network (hereinafter, used as the same meaning as 1×RTT) in an E-UTRAN will be described. For convenience of the description, a method of exchanging the location information between communication entities when the UE has an emergency call will be described as an embodiment. However, in the present specification, the embodiment is not limited to the emergency call, and can be applied to a general call.

Figure 11:
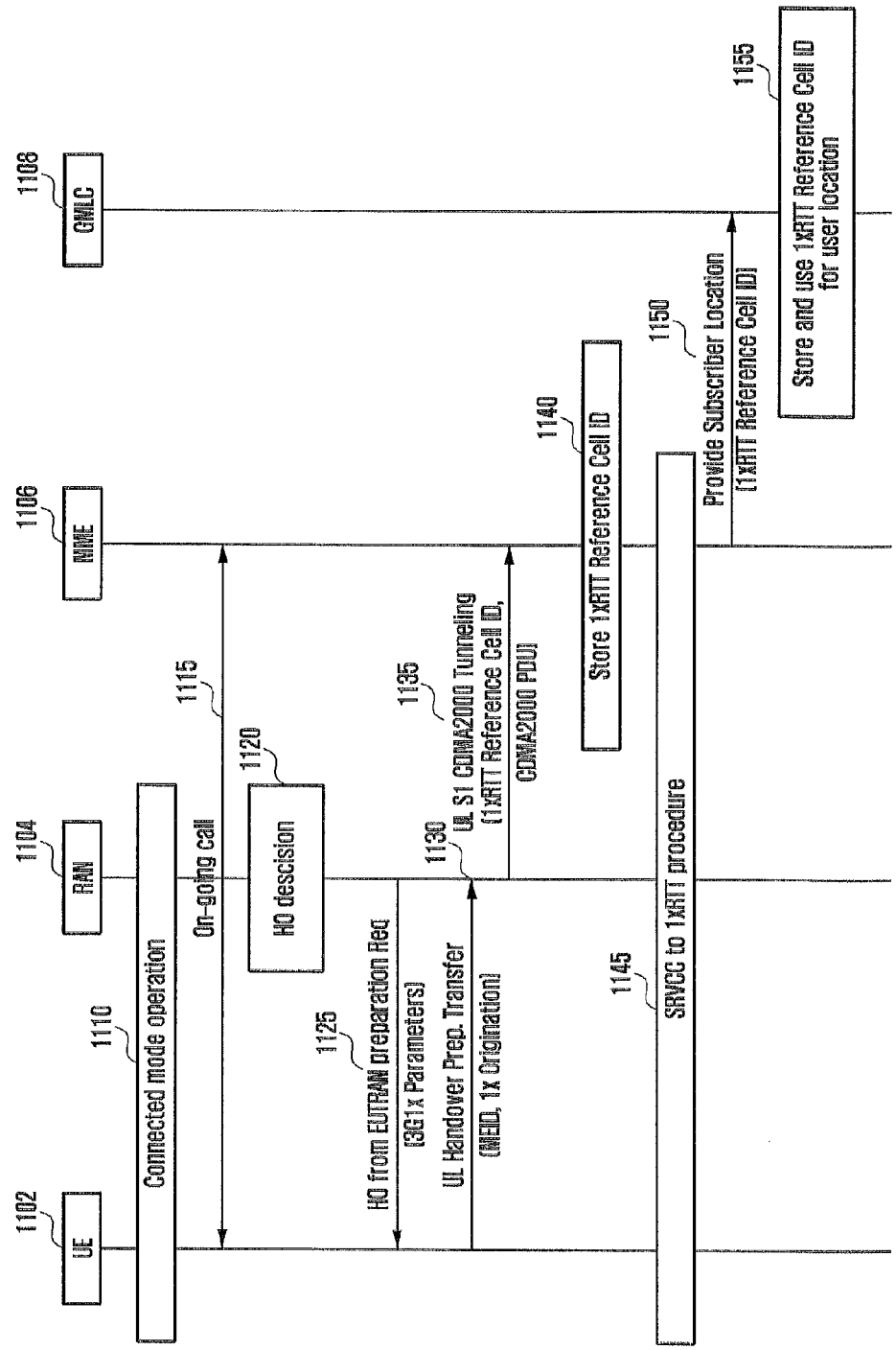
FIG. 11 is a signal flow diagram illustrating an example method of providing location information of a UE when a Single Radio Voice Call Continuity (SRVCC) proceeds to a 1×RTT network according to this disclosure.

FIG. 11 is a signal flow diagram illustrating an example method of providing location information of a UE when an SRVCC proceeds to a 1×RTT network according to this disclosure.

Referring to FIG. 11, a signal can be transmitted and received between two or more entities of a UE 1102, a Radio Access Network (RAN) 1104, a Mobility Management Entity (MME) 1106, and a Gateway Mobile Location Center (GMLC) 1108. Further, the RAN can be an eNB when the UE is provided with a service through an E-UTRAN.

In step 1110, the UE 1102 performs a connection operation with the RAN 1104, and in step 1115, the UE 1102 has an ongoing IMS Voice over PS (VoPS) call, which is generally called VoLTE, in a connection mode. In the embodiment, the IMS VoPS call can be formed via the RAN 1104, and the ongoing call can correspond to an emergency call.

In step 1120, the RAN 1104 determines HandOver (HO) according to states of the UE 1102 and a network, and performs an operation for the SRVCC process when the UE 1102 has the IMS VoPS call and a target cell to be handed over is a 1×RTT cell. In the embodiment, the target cell can be also referred to as an object cell.

In step 1125, the RAN 1104 transmits a Handover from EUTRA Preparation Request to the UE 1102, in order to start the SRVCC to the 1×RTT network. In the embodiment, the handover from a EUTRA Preparation Request includes at least one of 3G1× Overhead Parameters and a RAND value.

In step 1130, the UE 1102 transmits a UL handover preparation Transfer message to the RAN 1104 in response thereto. In the embodiment, the UL handover preparation Transfer message includes a 1×RTT Origination message, and can include at least one of an identity indicating an emergency type or a Mobile Equipment IDentity (MEID) (or an International Mobile Equipment Identity (IMEI)) when a call formed between the UE 1102 and the Ran 1104 is an emergency call.

In step 1135, the RAN 1104 transmits an Uplink S1 CDMA2000 Tunneling message to the MME 1106. In the embodiment, the Uplink S1 CDMA2000 Tunneling message includes at least one of an MEID, a RAND, 1× origination information, and a Reference Cell ID of a 1×RTT cell corresponding to a target of the SRVCC operation, which are received from the UE 1102, and can include a CDMA2000 HO Required Indication IE in order to notify the MME 1106 that a HO operation to the 1×RTT network is prepared. In the embodiment, the Reference Cell ID transmitted to the MME 1106 by the RAN 1104 can include MSCID and Cell or Sector information, the MSCID includes a Market ID or a Switch Number as an identity of a Mobile Switching Center (MSC), and the Cell or Sector information can include a cell identity or a sector number.

In step 1140 and step 1145, the MME 1106 performs an SRVCC process by using the information received from the RAN 1104. Further, in the embodiment, the MME 1106 stores the Reference Cell ID information, and uses the Reference Cell ID information, for the supporting of the location service and the continuity therefor.

In step 1150, the MME 1106 can transmit a message for a subscriber location report, to a GMLC 1108. In more detail, when the handover is completed, and a control plane scheme is used by an E-UTRAN network, the MME 1106 can transmit the message for a subscriber location report, to the GMLC 1108, in order to support the location service and the continuity therefor. In the embodiment, the message for the subscriber location report may be a Provide Location Answer.

The message transmitted to the GMCL 1108 can include at least one of an identity of the UE 1102 or the Reference Cell ID which the MME 1106 receives from the RAN 1104 and stores.

Further, in the embodiment, this information can be included in one AVP form of the message transmitted to the GMLC 1108 by the MME 1106, for example, the provision location answer message, and can be included in a form of one of a serving-node AVP and a Service-Area-Identity AVP. In more detail, the Serving-Node AVP or the Service-Area-Identity AVP included in the provision location answer transmitted to the GMLC 1108 by the MME 1106 can include the Reference Cell ID.

The process of transmitting this message and the process of providing location continuity of the GMLC 1108, which is generated due to this message, can be selectively applied only when the handed-over call is an emergency call in the embodiment.

In the embodiment, in step 1155, the GMLC 1108 can store the reference cell ID and can support the location continuity by using the reference cell ID received from the MME 1106, and through this operation, the location continuity can be possible even in the 1×RTT network.

Figure 12:
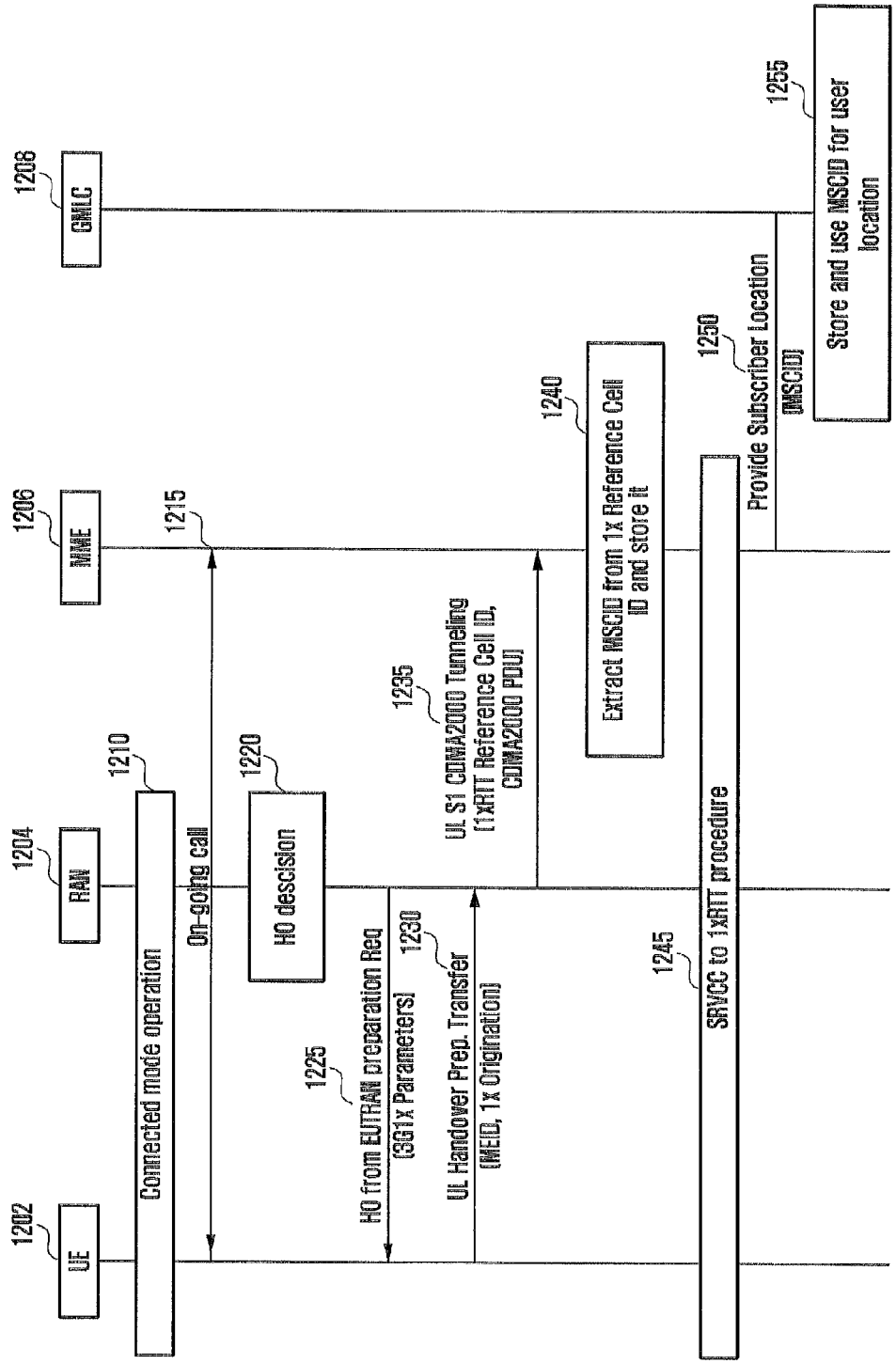
FIG. 12 is a signal flow diagram illustrating an example method of providing location information of a UE when an SRVCC proceeds to a 1×RTT network according to this disclosure.

FIG. 12 is a signal flow diagram illustrating an example method of providing location information of a UE when an SRVCC proceeds to a 1×RTT network according to this disclosure.

Referring to FIG. 12, a signal can be transmitted and received between two or more entities of a UE 1202, a Radio Access Network (RAN) 1204, a Mobility Management Entity (MME) 1206 and a Gateway Mobile Location Center (GMLC) 1208. Further, the RAN can be an eNB when the UE is provided with a service through an E-UTRAN.

In step 1210, the UE 1202 performs a connection operation with the RAN 1204, and in step 1215, the UE 1202 has an ongoing VoPS call, which is generally called VoLTE, in a connection mode. In the embodiment, the IMS VoPS call can be formed via the RAN 1204, and the ongoing call can correspond to an emergency call.

In step 1220, the RAN 1204 determines HO according to states of the UE 1202 and a network, and performs an operation for the SRVCC process when the UE 1202 has the IMS VoPS call and a target cell to be handed over is a 1×RTT cell.

In step 1225, the RAN 1204 transmits a handover from EUTRA Preparation Request to the UE 1202, in order to start the SRVCC to the 1×RTT network. In the embodiment, the Handover from EUTRA Preparation Request includes at least one of 3G1× Overhead Parameters and a RAND value.

In step 1230, the UE 1202 transmits a UL handover preparation Transfer message to the RAN 1204 in response thereto. In the embodiment, the UL handover preparation Transfer message includes a 1×RTT Origination message, and includes at least one of an identity indicating an emergency type or a MEID (or an IMEI) when a call formed between the UE 1202 and the RAN 1204 is an emergency call.

In step 1235, the RAN 1204 transmits an Uplink S1 CDMA2000 Tunneling message to the MME 1206. In the embodiment, the Uplink S1 CDMA2000 Tunneling message can include at least one of an MEID, a RAND, 1× origination information, and a Reference Cell ID of a 1×RTT cell corresponding to a target of the SRVCC operation, which are received from the UE 1202, and can include a CDMA2000 HO Required Indication IE in order to notify the MME 1206 that a HO operation to the 1×RTT network is prepared. In the embodiment, the Reference Cell ID transmitted to the MME 1204 by the RAN 1206 can include at least one of an MSCID and Cell or Sector information, the MSCID can include a Market ID or a switch number as an identity of a MSC, and the Cell or Sector information can include at least one of a cell identity and a sector number.

In step 1240 and step 1245, the MME 1206 performs an SRVCC process by using the information received from the RAN 1204. Further, in the embodiment, the MME 1206 can extract and store an MSCID part from the received Reference Cell ID information. The MME 1206 can trace a target MSC on the basis of the extracted MSCID and use the traced target MSC, for the supporting of the location service and the continuity therefor.

In step 1250, the MME 1206 transmits a message for a subscriber location report, to a GMLC 1208. In more detail, when the handover is completed, and a control plane scheme is used by an E-UTRAN network, the MME 1206 transmits the message for a subscriber location report, to the GMLC 1208, in order to support the location service and the continuity therefor. In the embodiment, the message for the subscriber location report can be a provision location answer message. In the embodiment, the provision location answer message can include at least one of an identity of the UE, and the MSCID extracted and stored from the reference cell ID received from the RAN 1204 by the MME 1206 in the prior step.

In the embodiment, the MSCID includes at least one of a market ID or a switch number, as an identity of the MSC. Further, this information can be included in one AVP form of a message transmitted to the GMLC 1208 by the MME 1206, for example, the provision location answer message. Further, this information can be included in a form of one of a serving-node AVP and a service-area-identity AVP. In more detail, the Serving-Node AVP or the Service-Area-Identity AVP included in the provision location answer transmitted to the GMLC 1206 by the MME 1208 can include the above-described 1×RTT MSCID.

The process of transmitting this message and the process of providing location continuity of the GMLC 1208, which is generated due to this message, can be applied only when the handed-over call is an emergency call in the embodiment.

In step 1255, the GMLC 1208 can store the MSCID received form the MME 1206 and can support the location continuity by using the MSCID received from the MME 1206, and through this operation, the location continuity is possible even in the 1×RTT network.

Figure 13:
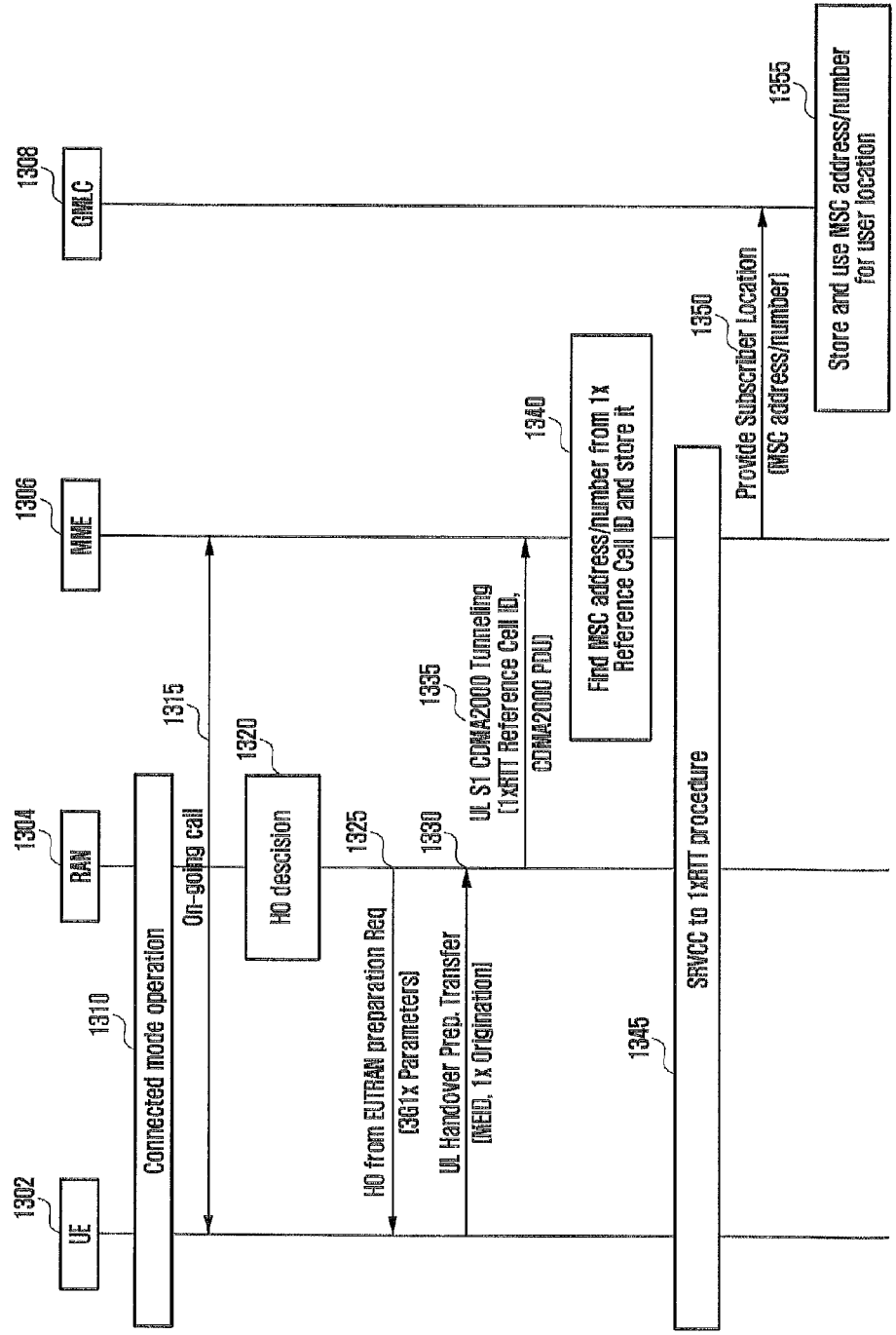
FIG. 13 is a signal flow diagram illustrating an example method of providing location information of a UE when an SRVCC proceeds to a 1×RTT network according to this disclosure.

FIG. 13 is a signal flow diagram illustrating an example method of providing location information of a user terminal when an SRVCC proceeds to a 1×RTT network according to this disclosure.

Referring to FIG. 13, a signal can be transmitted and received between two or more entities of a UE 1302, a Radio Access Network (RAN) 1304, a Mobility Management Entity (MME) 1306 and a Gateway Mobile Location Center (GMLC) 1308. Further, the RAN can be an eNB when the UE is provided with a service through an E-UTRAN.

In step 1310, the UE 1302 performs a connection operation with the RAN 1304, and in step 1315, the UE 1302 has an ongoing VoPS call, which is generally called VoLTE, in a connection mode. In the embodiment, the IMS VoPS call can be formed via the RAN 1204, and the ongoing call can correspond to an emergency call.

In step 1320, the RAN 1304 determines HO according to states of the UE 1302 and a network, and performs an operation for the SRVCC process when the UE 1302 has the IMS VoPS call, and a target cell to be handed over is a 1×RTT cell.

In step 1325, the RAN 1304 transmits Handover from EUTRA Preparation Request to the UE 1302, in order to start the SRVCC to the 1×RTT network. In the embodiment, the Handover from EUTRA Preparation Request can include at least one of 3G1× Overhead Parameters and a RAND value.

In step 1330, the UE 1302 transmits a UL handover preparation Transfer message to the RAN 1304 in response thereto. In the embodiment, the UL handover preparation Transfer message can include a 1×RTT Origination message, and can include at least one of an identity indicating an emergency type or a MEID (or an IMEI) when a call formed between the UE 1302 and the RAN 1304 is an emergency call.

In step 1335, the RAN 1304 transmits an Uplink S1 CDMA2000 Tunneling message to the MME 1306. In the embodiment, the Uplink S1 CDMA2000 Tunneling message can include at least one of an MEID, a RAND, 1× origination information, and a Reference Cell ID of a 1×RTT cell corresponding to a target of the SRVCC operation, which are received from the UE 1302, and can include a CDMA2000 HO Required Indication IE in order to notify the MME 1306 that an HO operation to the 1×RTT network is prepared. In the embodiment, the Reference Cell ID transmitted to the MME 1304 by the RAN 1306 can include at least one of an MSCID and Cell or Sector information, the MSCID can include a Market ID or a switch number as an identity of a MSC, and the Cell or Sector information can include at least one of a cell identity and a sector number.

In step 1340 and step 1345, the MME 1306 performs an SRVCC process by using the information received from the RAN 1304. Further, in the embodiment, the MME 1306 can identify at least one of an MSC address and an MSC number on the basis of the received reference cell ID information. To this end, the MME 1306 can use a table configured to indicate mapping of the MSC address or the MSC number for each Reference Cell ID, or a DNS Query, and the MSC number can be information encoded in a form of E.212.

In another embodiment, the MME 1306 can extract the MSCID from the Reference Cell ID, and can identify the MSC address or the MSC number by searching the mapping table previously configured on the basis of the information or by performing the DNS Query. The MME 1306 can store and use this information in order to support the location service and the continuity therefor.

In step 1350, the MME 1306 transmits a message for a subscriber location report, to the GMLC 1308. In more detail, when the handover is completed, and a control plane scheme is used by an E-UTRAN network, the MME 1306 can transmit the message for a subscriber location report, to the GMLC 1308, in order to support the location service and the continuity therefor. In the embodiment, the message for the subscriber location report can be a provision location answer message. In the embodiment, the provision location answer message can include the 1×RTT MSC address or the 1×RTT MSC number, which is identified from the identity of the UE or the Reference Cell ID received from the RAN 1304 by the MME 1306 in the prior step. In the embodiment, the MSC address or the MSC number can be used for allowing the GMLC 1308 to search for the MSC which provides a service to the UE in the 1×RTT network, and the MSC number can be encoded in a form of E.212.

This information can be included in one AVP form of the message transmitted to the GMLC 1306 by the MME 1308, for example, the provision location answer message, and especially, can be included in a form of one of a serving-node AVP and a service-area-identity AVP. In more detail, the Serving-Node AVP or the Service-Area-Identity AVP included in the provision location answer transmitted to the GMLC 1306 by the MME 1308 can include the 1×RTT MSC address or the 1×RTT MSC number.

The process of transmitting this message and the process of providing location continuity of the GMLC 1308 generated due to this message can be applied only when the handed-over call is an emergency call in the embodiment.

In step 1355, the GMLC 1308 can store 1×RTT MSC address or the 1×RTT MSC number received from the MME 1306 and can support the location continuity by using the 1×RTT MSC address or the 1×RTT MSC number received from the MME 1306, and through this operation, the location continuity can be possible even in the 1×RTT network.

When the UE deviates from an area where a VoIce MeSsage (VoIMS) service can be supported while the VoIMS service is provided, the UE can be switched to a network which supports a CS by applying a single radio voice call continuity (hereinafter, referred to as "SRVCC"), in order to maintain a call.

Even when a network (or a system) which supports the CS in an area where the UE is provided with a service is 1×RTT (or a similar network using CDMA2000 based 3GPP2 1×CS), the SRVCC scheme can be applied. When the SRVCC is generated, it is necessary to provide continuity for a location service which provides a location of a user of the UE.

In particular, when a currently underway call is an emergency call, provision of the location service and provision of the continuity therefor can be supported by a provider's policy or a region/country's rule. Further, even when the ongoing call is not an emergency call, it may be necessary to provide the location service and the continuity therefor.

Now, through an embodiment, a method for providing a location service and continuity therefor when an SRVCC proceeds to a 3GPP2 1×CS network (hereinafter, used as the same meaning as 1×RTT) in an E-UTRAN will be described. For convenience of the description, a method of exchanging the location information between communication entities when the UE has an emergency call will be described as an embodiment. However, in the present specification, the embodiment is not limited to the emergency call, and can be applied to a general call.

Figure 14:
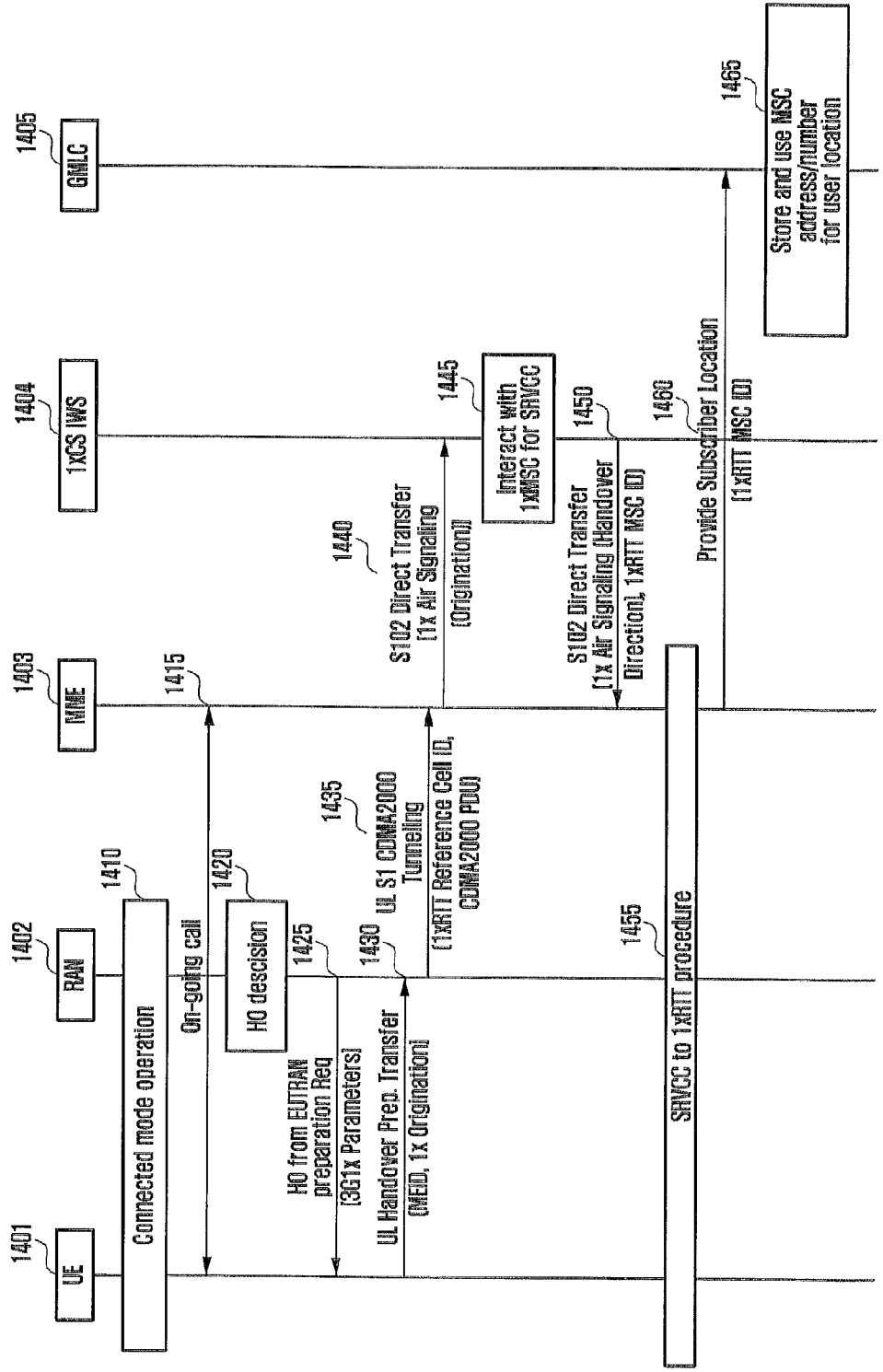
FIG. 14 is a signal flow diagram illustrating an example method of providing location information of a UE when an SRVCC proceeds to a 1×RTT network according to this disclosure.

FIG. 14 is a signal flow diagram illustrating an example method of providing location information of a user terminal when an SRVCC proceeds to a 1×RTT network according to this disclosure.

Referring to FIG. 14, a signal can be transmitted and received between entities of two or more of a UE 1401, a Radio Access Network (RAN) 1402, a Mobility Management Entity (MME) 1403, a 1×CS InterWorking Solution function (IWS) 1404 and a Gateway Mobile Location Center (GMLC) 1405. Further, the RAN 1402 can be an eNB when the UE is provided with a service through an E-UTRAN.

In step 1410, the UE 1401 is connected to the WLAN 1402.

In step 1415, the UE 1401 has an ongoing IMS VoPS call in a connection mode. In an embodiment, the IMS VoPS call can be a call generally called VoLTE. In the embodiment, the IMS VoPS call can be formed via the RAN 1402, and the ongoing call can correspond to an emergency call.

In step 1420, the RAN 1402 determines HO according to states of the UE 1401 and a network. When the RAN 1402 determines the HO, if the UE 1401 has the IMS VoPS call, and a target cell to be handed over is a 1×RTT cell, the RAN 1402 performs an operation for an SRVCC process. In the embodiment, the target cell can also be referred to as an object cell.

In step 1425, the RAN 1402 transmits a handover from EUTRA Preparation Request to the UE 1401, in order to start the SRVCC to the 1×RTT network. In the embodiment, the Handover from EUTRA Preparation Request includes at least one of 3G1× Overhead Parameters and a RAND value.

In step 1430, the UE 1401 transmits a UL handover preparation Transfer message to the RAN 1402 in response thereto. In the embodiment, the UL handover preparation Transfer message includes a 1×RTT Origination message, and can include at least one of an identity indicating an emergency type or a MEID (or IMEI) when a call by which the UE 1401 receives a service through the RAN 1402 is an emergency call.

In step 1435, the RAN 1402 transmits an Uplink S1 CDMA2000 Tunneling message to the MME 1403. In the embodiment, the Uplink S1 CDMA2000 Tunneling message includes at least one of an MEID, a RAND, 1× origination information, and a Reference Cell ID of a 1×RTT cell corresponding to a target of the SRVCC operation, which are received from the UE 1401, and can include a CDMA2000 HO Required Indication IE in order to notify the MME 1403 that an HO operation to the 1×RTT network is prepared. Further, in the embodiment, the Reference Cell ID transmitted to the MME 1402 by the RAN 1403 can include at least one of an MSCID and Cell or Sector information, the MSCID can include a Market ID or a switch number as an identity of a MSC, and the Cell or Sector information can include at least one of a cell identity and a sector number.

In an embodiment, the MSCID can be an identity referring to a 1×CS IWS (SRVCC IWS for 3GPP2 1×CS) which is connected with the MME 1403.

In step 1440, the MME 1403 performs an SRVCC process by using one or more pieces of the information received from the RAN 1402. The MME 1403 transmits a message for performing the SRVCC process, to a selected 1×CS IWS 1404. That is, the MME 1403 transmits a 1× Air Interface Signaling (S102 Direct Transfer) message to the 1×CS IWS 1404, and this message includes one or more of a 1×RTT Reference Cell ID, a 1× Origination message, an MEID and a RAND value, which are received.

In step 1445, the IxCS IWS 1404 mutually exchanges a message with a 1×RTT MSC if it is necessary for performing the SRVCC process, and the mutual message exchange can be selectively proceed.

In step 1450, the 1×CS IWS 1404 transmits an A21 message, such as a 1× Air Interface Signaling (S102 Direct Transfer) message, to the MME 1403. This message can include a 1× handoff direction message. Further, this message can include at least one of an identity (1×RTT MSC identity) and an address (1×RTT MSC address or number) indicating a 1×RTT MSC (such as a 1×RTT MSC to which the UE is registered) which provides an actual 1×CS service to the UE. That is, the 1× Air Interface Signaling message can include at least one the MSC identity having an identity for the 1×RTT MSC and a serving node identity IE.

In step 1455, an entity of at least one of the UE 1401, the RAN 1402 and the MME 1403 performs an operation for the SRVCC process to the 1×RTT network.

In step 1460, the MME 1403 transmits a message for a subscriber location report, to the GMLC 1405. In more detail, when the handover is completed, and a control plane scheme is used by an E-UTRAN network, the MME 1403 transmits the message for a subscriber location report, to the GMLC 1405, in order to support the location service and the continuity therefor. In an embodiment, the message for the subscriber location report can be a provision location answer message.

In an embodiment, the message transmitted to the GMCL 1405 can include at least one of an identity of the UE 1401, an identity of a 1×RTT MSC, which is received from the 1×CS IWS by the MME 1403 through a A21 message (1× Air Interface Signaling message), and the Reference Cell ID which is received from the RAN 1402 by the MME 1403 and stored.

Further, in an embodiment, this information can be included in one AVP form of the message transmitted to the GMLC 1405 by the MME 1403, for example, the provision location answer message, and can be included in a form of one of a serving-node AVP and a Service-Area-Identity AVP. In more detail, the Serving-Node AVP or the Service-Area-Identity AVP included in the provision location answer transmitted to the GMLC 1403 by the MME 1405 can include at least one of the 1×RTT MSC Identity, the 1×RTT MSC address or number and the Reference Cell ID.

In an embodiment, the process of transmitting this message and the process of providing location continuity of the GMLC 1405, which is generated due to this message, can be selectively applied only when the handed-over call is an emergency call.

In step 1465, the GMLC 1405 stores information received from the MME 1403 and performs an operation related to the user's location information by using the same. In an embodiment, the GMLC 1405 can support the location continuity by using the information (the 1×RTT MSC Identity, the 1×RTT MSC address/number, or the Reference Cell ID) received from the MME 1403, and the location continuity can be supported even in the 1×RTT network through this operation.

Meanwhile, when the 1×CS IWS 1404 does not provide an identity of the 1×RTT MSC in step 1450 of the embodiment, the MME 1403 finds the identity of the 1×RTT MSC, which provides a service to the UE 1401, by using the Reference Cell ID received in step 1435, and provides the found identity of the 1×RTT MSC to the GMLC 1405 in step 1460. In this case, the MSCID included in the Reference Cell ID received from the RAN 1402 by the MME 1403 and the 1×RTT MSC identity provided from the MME 1403 to the GMLC 1405 can be different from each other.

In an embodiment, information (such as a mapping table) including the identity of the 1×RTT MSC corresponding to each Reference Cell ID can be configured in the MME 1403 in order to allow the MME 1403 to find the identity of the 1×RTT MSC by which the UE 1401 receives a service through the Reference Cell ID. In the process of finding the identity corresponding thereto, all pieces of information of the Reference Cell ID (all bits of the Reference Cell ID) can be used, or some of the pieces of the information can be used through a mask. The information on the identity corresponding thereto may be determined by predetermined information.

In the above-described embodiments, all steps can be selectively performed or can be omitted. Further, steps in each embodiment do not have to be sequentially performed and can be transposed. Meanwhile, the exemplary embodiments disclosed herein are merely presented to easily describe technical contents of the present specification and help the understanding of the present specification and are not intended to limit the scope of this disclosure. That is, it is obvious to those skilled in the art to which the present disclosure belongs that different modifications can be achieved based on the technical spirit of the present disclosure.

In the embodiment, at least one of the UE, the RAN, the MME, the 1×CS IWS and the GMLC includes a transmission and reception unit for transmitting and receiving a signal to or from another entity, and a controller for controlling the transmission and reception unit and controlling an operation of each entity. The controller controls the operation of each entity, which has been described in the embodiments, and can include one or more logical or physical modules for performing each function.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method implemented by a mobility management entity (MME) in a mobile communication system, the method comprising:
   receiving, from a base station (BS), a first message including first information related to handover of a terminal from a source network to a target network; and
   transmitting, to a location server, a second message including an identity of the terminal based on the first message,
   wherein the second message comprises a single-carrier radio transmission technology (1×RTT) reference cell identity (ID) corresponding to the target network, if the target network is associated with a 1×RTT and if a control plane location solution is used on a source network.

2. The method of claim 1, further comprising: receiving, from the BS, the 1×RTT reference cell ID corresponding to the target network related to a location of the terminal.

3. The method of claim 1, wherein the first information includes at least one of a mobile equipment identifier (MEID) of the terminal, a random number (RAND) generated by the BS, and information for a 1× origination.

4. A method implemented by a base station (BS) of a source network in a mobile communication system, the method comprising:
   receiving, from a terminal, a first message including first information related to a handover of the terminal from the source network to a target network; and
   transmitting, to a mobility management entity (MME), a second message including an identity of the terminal based on the first information,
   wherein a third message is transmitted from the MME to a location server based on the second message;
   wherein the third message comprises a single-carrier radio transmission technology (1×RTT) reference cell identity (ID) corresponding to the target network if the target network is associated with an 1×RTT and if a control plane location solution is used on the source network.

5. The method of claim 4, further comprising:
   transmitting, to the mobility management entity, the 1×RTT reference cell ID corresponding to the target network related to a location of the terminal.

6. The method of claim 4, wherein the second message includes at least one of a mobile equipment identifier (MEID) of the terminal, a random number (RAND) generated by the BS, and information for a 1× origination.

7. An apparatus of a mobility management entity (MME) in a mobile communication system, the apparatus comprising:
   a transceiver configured to transmit and receive at least one signal; and
   a controller coupled with the transceiver and configured:
      receive, from a base station (BS), a first message including first information related to a handover of a terminal from a source network to a target network, and
      transmit, to a server, a second message including an identity of the terminal based on the first message, wherein the second message comprises a single-carrier radio transmission technology (1×RTT) reference cell identity (ID) corresponding to the target network, if the target network is associated with an 1×RTT and if a control plane location solution is used on a source network.

8. The apparatus of claim 7, wherein the controller is further configured to receive, from the BS, the 1×RTT reference cell ID corresponding to the target network related to a location of the terminal.

9. The apparatus of claim 7, wherein the first information includes at least one of a mobile equipment identifier (MEID) of the terminal, a random number (RAND) generated by the BS, and information for a 1× origination.

10. An apparatus of a base station (BS) of a source network in a mobile communication system, the apparatus comprising:
a transceiver configured to transmit and receive at least one signal; and
a controller coupled with the transceiver and configured:
receive, from a terminal, a first message including first information related to a handover of the terminal from the source network to a target network, and
transmit, to a mobility management entity (MME), a second message including an identity of the terminal based on the first message,
wherein a third message is transmitted from the MME to a location server based on the second message; and
wherein the third message comprises a single-carrier radio transmission technology (1×RTT) reference cell identity (ID) corresponding to the target network if the target network is associated with an 1×RTT and if a control plane location solution is used on the source network.

11. The apparatus of claim 10, wherein the controller is further configured to control the transceiver to transmit, the MME, the 1×RTT reference cell ID corresponding to the target network related to a location of the terminal.

12. The apparatus of claim 10, wherein the second message includes at least one of a mobile equipment identifier (MEID) of the terminal, a random number (RAND) generated by the BS, and information for a 1× origination.

* * * * *